(12) United States Patent
Matsuzaki

(10) Patent No.: US 6,609,099 B1
(45) Date of Patent: Aug. 19, 2003

(54) APPARATUS FOR AUTOMATICALLY APPLYING AND PREPARING SOFTWARE, AND RECORDING MEDIUM FOR PREPARING SOFTWARE

(75) Inventor: Tadao Matsuzaki, Tokyo (JP)

(73) Assignee: Knowledge Modeling Institute Inc., Tokyo (JP)

( * ) Notice: Subject to any disclaimer, the term of this patent is extended or adjusted under 35 U.S.C. 154(b) by 321 days.

(21) Appl. No.: 09/630,361

(22) Filed: Aug. 1, 2000

Related U.S. Application Data

(63) Continuation of application No. 09/120,987, filed on Jul. 22, 1998.

(30) Foreign Application Priority Data

| Jul. 30, 1997 | (JP) | ............................................. 9-204747 |
| Jul. 30, 1997 | (JP) | ............................................. 9-204748 |

(51) Int. Cl.$^7$ ............................................. G06F 15/18

(52) U.S. Cl. ........................ 705/7; 705/1; 703/2; 703/6

(58) Field of Search ..................... 705/1, 7, 8; 717/101, 717/104, 108; 707/103; 703/2, 6

(56) References Cited

U.S. PATENT DOCUMENTS

| 5,159,687 | A | * | 10/1992 | Richburg ..................... 395/702 |
| 5,233,513 | A | * | 8/1993 | Doyle ........................... 705/7 |
| 5,390,330 | A | * | 2/1995 | Talati .......................... 395/703 |
| 5,485,615 | A | * | 1/1996 | Wennmyr ..................... 395/702 |
| 5,539,862 | A | * | 7/1996 | Short et al. ................... 706/45 |
| 5,706,405 | A | * | 1/1998 | Short et al. ................... 706/45 |
| 5,761,493 | A | * | 6/1998 | Blakeley et al. ................ 707/4 |
| 5,848,426 | A | * | 12/1998 | Wang et al. ................. 358/448 |
| 5,860,005 | A | * | 1/1999 | Inoue ......................... 717/101 |
| 5,890,132 | A | * | 3/1999 | Sanders ......................... 705/7 |
| 5,903,453 | A | * | 5/1999 | Stoddard II ................. 364/184 |
| 6,237,045 | B1 | * | 5/2001 | Enomoto ..................... 706/11 |
| 6,256,030 | B1 | * | 7/2001 | Berry et al. ................. 345/854 |

FOREIGN PATENT DOCUMENTS

| DE | 4417393 A1 | 11/1994 | ............. G06F/9/45 |
| EP | 0549112 A2 | 6/1993 | ............. G06F/9/44 |
| EP | 0722140 A1 | 7/1996 | ............. G06F/9/06 |
| JP | 63-305460 A | 12/1988 | ........... G06F/15/22 |
| JP | 3-62262 A | 3/1991 | ........... G06F/15/22 |
| JP | 4-62662 A | 2/1992 | ........... G06F/15/22 |
| JP | 4-76768 A | 3/1992 | ........... G06F/15/22 |
| JP | 4-369772 A | 12/1992 | ........... G06F/15/22 |

(List continued on next page.)

OTHER PUBLICATIONS

Holowatyj et al. ; Business Modernization Opportunities with Optical Network Units, %th Conference on Optical/Hybrid Acess networks, Sep. 1993.*

Bridgeland et al. "Simulation Satyagraha, . . . ", Proceeds of the 1994 Winter Simulation Conference.*

Kiem–Phong Vo, AT&T Bell Laboratories, "IFS: A Tool to Build Application Systems", IEEE Software, vol. 7, No. 4, Jul. 1990, pp. 29–36, Los Alamitos, CA, US.

(List continued on next page.)

*Primary Examiner*—Vincent Millin
*Assistant Examiner*—Jagdish Patel
(74) *Attorney, Agent, or Firm*—Ron Fish; Ronald L. Fish, A Law Corporation

(57) ABSTRACT

When data is simply input without being aware of describing a program language (e.g., COBOL or FORTRAN), the data input meaning is detected, and software for this data processing is automatically applied and prepared. Various types of worksheets corresponding to the business logic terms and data input positions are stored in a business data file. When an operation unit is operated and data is input to the data input position, the input data is stored as rule setting data. When application data corresponding to the rule setting data is input through the operation unit, a business logic applying section determines the use software in accordance with the corresponding business logic term.

31 Claims, 55 Drawing Sheets

FOREIGN PATENT DOCUMENTS

| | | | | |
|---|---|---|---|---|
| JP | 5-46623 | A | 2/1993 | ........... G06F/15/22 |
| JP | 06314289 | A | 11/1994 | ........... G06F/15/22 |
| JP | 8-137679 | | 5/1996 | |
| JP | 8-185455 | | 7/1996 | |
| WO | WO 94/29786 | * | 12/1994 | ........... G06F/3/023 |

OTHER PUBLICATIONS

3–62262 (A) Mar. 18, 1991 Japan G06F15/22 Yes.

06314289 Nov. 8, 1994 G0F 15/22 Yes.

5–46623 (A) Feb. 26, 1993 Japan G06F 15/22 Yes.

4–369772 (A) Dec. 22, 1992 Japan G06F 15/22 Yes.

63–305460 (A) Dec. 13, 1988 Japan G06F 15/22 Yes.

4–76768 (A) Mar. 11, 1992 Japan G06F 15/22 Yes.

4–62662 (A) Feb. 27, 1992 Japan G06F 15/22 Yes.

Kiem–Phong, Vo, AT&T Bell Laboratories, "IFS: A Tool to Build Applications Systems", IEEE Software, CVol. 7, No. 4, Jul. 1990, pp. 29–36, Los Alamitos, CA, US.

* cited by examiner

| DESCRIPTION OF CREDIT AMOUNT OF CLIENT |||| 
|---|---|---|---|
| CLIENT NO. 020010    CLIENT NAME    ABCDE COMPANY ||||
| DATA OF START OF APPLICATION | DATA OF END OF APPLICATION | CREDIT AMOUNT | STOP OF APPLICATION |
| 97/06/06 | 00/00/00 | 200,000,000 | |
| | | | |
| | | END | CANCEL |

[SETTING WINDOW]

FIG. 3A

| ORDER RECEPTION |
|---|
| CLIENT NO. 020010    CLIENT NAME    ABCDE COMPANY |
| MERCHANDISE CODE XX0001    UNIT PRICE XXXX    QUANTITY YYYY |
| AMOUNT OF ORDER RECEIVED  OOOOOO |
| |

[APPLICATION WINDOW]

FIG. 3B

| BUSINESS TERM | WORKSHEET | APPLICATION SOFTWARE (UPPER LIMIT) (LOWER LIMIT) (PRESENCE) (TOTAL AMOUNT) |
|---|---|---|
| DATA | 00000 | PRESENCE |
| CLIENT NO. | 00000 | PRESENCE |
| MERCHANDISE CODE | 01000 | PRESENCE |
| AMOUNT OF ORDER RECEIVED | 10100 | UPPER LIMIT |
| ⋮ | ⋮ | ⋮ |

| No. | COMPUTER BUSINESS OPERATION PROCESSING (BUSINESS OPERATION PROCESSING MINIMUM UNIT REFERENCE/COMPUTER BUSINESS OPERATION PROCESSING REFERENCE) | COMPUTER BUSINESS OPERATION PROCESSING STANDARD |||||||||
|---|---|---|---|---|---|---|---|---|---|---|
| | | RULE SETTING BUSINESS OPERATION | COMMERCIAL TRANSACTION OPERATION | ALLOTMENT OPERATION | CIRCULATION OPERATION | MANUFACTURING OPERATION | SLIPS FOR RECORDING BASIC BUSINESS OPERATIONS (SLIP FILLING REFERENCE/WINDOW DESIGN REFERENCE) | BOOKS/SLIPS/LEDGERS FOR RECORDING BASIC BUSINESS OPERATIONS (ENTRY REFERENCE/DATA FILE DESIGN REFERENCE) | COMMERCIAL CODE REFERENCE | ACCOUNTING REFERENCE | TAX REFERENCE | SECURITIES EXCHANGE REFERENCE |
| 1 | SETTING OF BUSINESS DAY | ○ | | | | | BUSINESS DAY CALENDAR | BUSINESS DAY CALENDAR | | | | |
| 2 | REGISTRATION OF PERSON IN CHARGE | ○ | | | | | PERSON IN CHARGE | PERSON IN CHARGE | | | | |
| 3 | SETTING OF SALES MERCHANDISE OF PERSON IN CHARGE | ○ | | | | | SALES MERCHANDISE OF PERSON IN CHARGE | SALES MERCHANDISE OF PERSON IN CHARGE | | | | |
| 4 | SETTING OF CLIENT OF PERSON IN CHARGE | ○ | | | | | CLIENT OF PERSON IN CHARGE | CLIENT OF PERSON IN CHARGE | | | | |
| 5 | SETTING OF AUTHORITY OF PERSON | ○ | | | | | SALES AUTHORITY OF PERSON IN CHARGE | SALES AUTHORITY OF PERSON IN CHARGE | | | | |
| 6 | SETTING OF PURCHASE MERCHANDISE OF PERSON IN CHARGE | ○ | | | | | PURCHASE MERCHANDISE OF PERSON IN CHARGE | PURCHASE MERCHANDISE OF PERSON IN CHARGE | | | | |
| 7 | SETTING OF SUPPLIER OF PERSON IN CHARGE | ○ | | | | | SUPPLIER OF PERSON IN CHARGE | SUPPLIER OF PERSON IN CHARGE | | | | |
| 8 | SETTING OF PURCHASE AUTHORITY OF PERSON | ○ | | | | | PURCHASE AUTHORITY OF PERSON IN CHARGE | PURCHASE AUTHORITY OF PERSON IN CHARGE | | | | |
| 9 | REGISTRATION OF ORGANIZATION | ○ | | | | | ORGANIZATION CHART | ORGANIZATION CHART | | | | |
| 10 | SETTING OF BUSINESS DAY OF ORGANIZATION | ○ | | | | | BUSINESS DAY OF ORGANIZATION | BUSINESS DAY OF ORGANIZATION | | | | |
| 11 | SETTING OF SALES MERCHANDISE OF ORGANIZATION | ○ | | | | | SALES MERCHANDISE OF ORGANIZATION | SALES MERCHANDISE OF ORGANIZATION | | | | |
| 12 | SETTING OF CLIENT OF ORGANIZATION | ○ | | | | | CLIENT OF ORGANIZATION | CLIENT OF ORGANIZATION | | | | |

| | | | | | | | | | | | | |
|---|---|---|---|---|---|---|---|---|---|---|---|---|
| 13 | SETTING OF CLIENT ORGANIZATION OF ORGANIZATION | ○ | | | CLIENT ORGANIZATION OF ORGANIZATION | CLIENT ORGANIZATION OF ORGANIZATION | | | | | | |
| 14 | SETTING OF PURCHASE MERCHANDISE OF ORGANIZATION | ○ | | | PURCHASE MERCHANDISE OF ORGANIZATION | PURCHASE MERCHANDISE OF ORGANIZATION | | | | | | |
| 15 | SETTING OF SUPPLIER OF ORGANIZATION | ○ | | | SUPPLIER OF ORGANIZATION | SUPPLIER OF ORGANIZATION | | | | | | |
| 16 | SETTING OF SUPPLIER ORGANIZATION OF ORGANIZATION | ○ | | | SUPPLIER ORGANIZATION OF ORGANIZATION | SUPPLIER ORGANIZATION OF ORGANIZATION | | | | | | |
| 17 | OPENING OF CLIENT ACCOUNT | ○ | | | CLIENT ACCOUNT OPENING SLIP | CLIENT REGISTER | ○ | ○ | ○ | ○ | ○ | |
| 18 | STOP OF TRANSACTION FOR CLIENT ACCOUNT | ○ | | | CLIENT ACCOUNT TRANSACTION STOP SLIP | CLIENT REGISTER | ○ | ○ | ○ | ○ | ○ | |
| 19 | RESTART OF TRANSACTION FOR CLIENT ACCOUNT | ○ | | | CLIENT ACCOUNT TRANSACTION RESTART SLIP | CLIENT REGISTER | ○ | ○ | ○ | ○ | ○ | |
| 20 | CLOSING OF CLIENT ACCOUNT | ○ | | | CLIENT ACCOUNT CLOSING SLIP | CLIENT REGISTER | ○ | ○ | ○ | ○ | ○ | |
| 21 | RESTORATION OF CLIENT ACCOUNT | ○ | | | CLIENT ACCOUNT TRANSACTION RESTORATION SLIP | CLIENT REGISTER | ○ | ○ | ○ | ○ | ○ | |
| 22 | SETTING OF BUSINESS DAY OF CLIENT | ○ | | | BUSINESS DAY CALENDAR OF CLIENT | BUSINESS DAY CALENDAR OF CLIENT | | | | | | |
| 23 | SETTING OF ORGANIZATION OF CLIENT | ○ | | | ORGANIZATION CHART OF CLIENT | ORGANIZATION CHART OF CLIENT | | | | | | |
| 24 | SETTING OF COLLECTION SCHEDULE DATE OF CLIENT | ○ | | | COLLECTION SCHEDULE DATE OF CLIENT | COLLECTION SCHEDULE DATE OF CLIENT | | | | | | |
| 25 | SETTING OF BILLING PERIOD OF CLIENT | ○ | | | BILLING PERIOD OF CLIENT | BILLING PERIOD OF CLIENT | | | | | | |
| 26 | SETTING OF DEADLINE OF CLIENT | ○ | | | DEADLINE OF CLIENT | DEADLINE OF CLIENT | | | | | | |

| # | Input | | Delivery Destination of Client | Table of Credit Amount of Client | Slip of Start of Sales of Sales Merchandise | Sales Stop Slip of Sales Merchandise | Sales Restart Slip of Sales Merchandise | Sales Abandonment Slip of Sales Merchandise | Sales Restoration Slip of Sales Merchandise | Price List of Sales Merchandise | Quantity Discount Price List of Sales Merchandise | Good Buy Related to Sales Merchandise | Substitute of Sales Merchandise | Merchandise Similar to Sales Merchandise | Strategic Stock of Sales Merchandise | Sales Lot of Sales Merchandise | Delivery Destination of Client | Table of Credit Amount of Client | Sales Merchandise Register | Sales Merchandise Register | Sales Merchandise Register | Sales Merchandise Register | Sales Merchandise Register | Price List of Sales Merchandise | Quantity Discount Price List of Sales Merchandise | Good Buy Related to Sales Merchandise | Substitute of Sales Merchandise | Merchandise Similar to Sales Merchandise | Strategic Stock of Sales Merchandise | Sales Lot of Sales Merchandise |
|---|---|---|---|---|---|---|---|---|---|---|---|---|---|---|---|---|---|---|---|---|---|---|---|---|---|---|---|---|---|
| 27 | Setting of Delivery Destination of Client | ○ | | | | | | | | | | | | | | | | | | | | | | | | | | | | |
| 28 | Setting of Credit Amount of Client | ○ | | | | | | | | | | | | | | | | | | | | | | | | | | | | |
| 29 | Registration of Sales of Sales Merchandise | ○ | | | | | | | | | | | | | | | | | ○ | | | | | | | | | | | |
| 30 | Stop of Sales of Sales Merchandise | ○ | | | | | | | | | | | | | | | | | | ○ | | | | | | | | | | |
| 31 | Restart of Sales of Sales Merchandise | ○ | | | | | | | | | | | | | | | | | | | ○ | | | | | | | | | |
| 32 | Abandonment of Sales of Sales Merchandise | ○ | | | | | | | | | | | | | | | | | | | | ○ | | | | | | | | |
| 33 | Restoration of Sales of Sales Merchandise | ○ | | | | | | | | | | | | | | | | | | | | | ○ | | | | | | | |
| 34 | Setting of Sales Price of Sales Merchandise | ○ | | | | | | | | | | | | | | | | | | | | | | ○ | | | | | | |
| 35 | Setting of Quantity Discount Price of Sales Merchandise | ○ | | | | | | | | | | | | | | | | | | | | | | | ○ | | | | | |
| 36 | Setting of Good Buy Related to Sales Merchandise | ○ | | | | | | | | | | | | | | | | | | | | | | | | ○ | | | | |
| 37 | Setting of Substitute of Sales Merchandise | ○ | | | | | | | | | | | | | | | | | | | | | | | | | ○ | | | |
| 38 | Setting of Merchandise Similar to Sales Merchandise | ○ | | | | | | | | | | | | | | | | | | | | | | | | | | ○ | | |
| 39 | Setting of Strategic Stock of Sales Merchandise | ○ | | | | | | | | | | | | | | | | | | | | | | | | | | | ○ | |
| 40 | Setting of Sales Lot of Sales Merchandise | ○ | | | | | | | | | | | | | | | | | | | | | | | | | | | | ○ |

| | | | | | | | |
|---|---|---|---|---|---|---|---|
| 41 | SETTING OF DELIVERY LOT OF SALES MERCHANDISE | | | ○ | DELIVERY LOT OF SALES MERCHANDISE | DELIVERY LOT OF SALES MERCHANDISE | |
| 42 | SETTING OF TIME REQUIRED FOR DELIVERY OF SALES MERCHANDISE | | | ○ | TIME REQUIRED FOR DELIVERY OF SALES MERCHANDISE | TIME REQUIRED FOR DELIVERY OF SALES MERCHANDISE | |
| 43 | SETTING OF STOCK LIMIT OF SALES MERCHANDISE | | | ○ | STOCK LIMIT OF SALES MERCHANDISE | STOCK LIMIT OF SALES MERCHANDISE | |
| 44 | SETTING OF APPROPRIATE STOCK OF SALES MERCHANDISE | | | ○ | APPROPRIATE STOCK OF SALES MERCHANDISE | APPROPRIATE STOCK OF SALES MERCHANDISE | |
| 45 | SETTING OF ORDERING POINT OF SALES MERCHANDISE | | | ○ | ORDERING POINT OF SALES MERCHANDISE | ORDERING POINT OF SALES MERCHANDISE | |
| 46 | SETTING OF SALES PLAN OF SALES MERCHANDISE | | | ○ | WRITTEN SALES PLAN OF SALES MERCHANDISE | WRITTEN SALES PLAN OF SALES MERCHANDISE | |
| 47 | SALES REGISTRATION OF SALES MERCHANDISE FOR EACH CLIENT | | | ○ | SALES START SLIP OF SALES MERCHANDISE FOR CLIENT | SALES REGISTER OF SALES MERCHANDISE FOR CLIENT | |
| 48 | STOP OF SALES OF SALES MERCHANDISE FOR EACH CLIENT | | | ○ | SALES STOP SLIP OF SALES MERCHANDISE FOR CLIENT | SALES REGISTER OF SALES MERCHANDISE FOR CLIENT | |
| 49 | RESTART OF SALES OF SALES MERCHANDISE FOR EACH CLIENT | | | ○ | SALES RESTART SLIP OF SALES MERCHANDISE FOR CLIENT | SALES REGISTER OF SALES MERCHANDISE FOR CLIENT | |
| 50 | ABANDONMENT OF SALES OF SALES MERCHANDISE FOR EACH CLIENT | | | ○ | SALES ABANDONMENT SLIP OF SALES MERCHANDISE FOR CLIENT | SALES REGISTER OF SALES MERCHANDISE FOR CLIENT | |
| 51 | RESTORATION OF SALES OF SALES MERCHANDISE FOR EACH CLIENT | | | ○ | SALES RESTORATION SLIP OF SALES MERCHANDISE FOR CLIENT | SALES REGISTER OF SALES MERCHANDISE FOR CLIENT | |
| 52 | SETTING OF SALES PRICE OF SALES MERCHANDISE FOR EACH CLIENT | | | ○ | SALES PRICE LIST OF SALES MERCHANDISE FOR CLIENT | SALES PRICE LIST OF SALES MERCHANDISE FOR CLIENT | |

FIG. 6D

| # | Operation | | | | | Output 1 | Output 2 |
|---|---|---|---|---|---|---|---|
| 53 | SETTING OF QUANTITY DISCOUNT PRICE OF SALES MERCHANDISE FOR EACH CLIENT | ○ | | | | QUANTITY DISCOUNT PRICE LIST OF SALES MERCHANDISE FOR EACH CLIENT | QUANTITY DISCOUNT PRICE LIST OF SALES MERCHANDISE FOR EACH CLIENT |
| 54 | SETTING OF QUANTITY ALLOTMENT OF SALES MERCHANDISE FOR EACH CLIENT | ○ | | | | QUANTITY ALLOTMENT TABLE OF SALES MERCHANDISE FOR EACH CLIENT | QUANTITY ALLOTMENT TABLE OF SALES MERCHANDISE FOR EACH CLIENT |
| 55 | REGISTRATION OF BANKING ORGANIZATION ACCOUNT FOR SALES COLLECTION | ○ | | | | REGISTRATION SLIP OF BANKING ORGANIZATION ACCOUNT FOR SALES COLLECTION | COLLECTION BANKING ORGANIZATION ACCOUNT REGISTER |
| 56 | STOP OF TRANSACTION FOR BANKING ORGANIZATION ACCOUNT FOR SALES COLLECTION | ○ | | | | STOP SLIP OF BANKING ORGANIZATION ACCOUNT FOR SALES COLLECTION | COLLECTION BANKING ORGANIZATION ACCOUNT REGISTER |
| 57 | RESTART OF BANKING ORGANIZATION ACCOUNT FOR SALES COLLECTION | ○ | | | | RESTART SLIP OF BANKING ORGANIZATION ACCOUNT FOR SALES COLLECTION | COLLECTION BANKING ORGANIZATION ACCOUNT REGISTER |
| 58 | ABANDONMENT OF BANKING ORGANIZATION ACCOUNT FOR SALES COLLECTION | ○ | | | | ABANDONMENT SLIP OF BANKING ORGANIZATION ACCOUNT FOR SALES COLLECTION | COLLECTION BANKING ORGANIZATION ACCOUNT REGISTER |
| 59 | RESTORATION OF BANKING ORGANIZATION ACCOUNT FOR SALES COLLECTION | ○ | | | | RESTORATION SLIP OF BANKING ORGANIZATION ACCOUNT FOR SALES COLLECTION | COLLECTION BANKING ORGANIZATION ACCOUNT REGISTER |
| 60 | SETTING OF SALES TAX RATE INFORMATION | ○ | | | ○ | SALES TAX RATE INFORMATION | SALES TAX RATE INFORMATION |
| 61 | REPORT OF POTENTIAL CUSTOMER | | ○ | | ○ | POTENTIAL CUSTOMER REPORT | POTENTIAL CUSTOMER REGISTER |
| 62 | CORRECTION REPORT OF POTENTIAL CUSTOMER INFORMATION | | ○ | | ○ | POTENTIAL CUSTOMER REPORT | POTENTIAL CUSTOMER REGISTER |
| 63 | CANCELLATION REPORT OF POTENTIAL CUSTOMER INFORMATION | | ○ | | | POTENTIAL CUSTOMER REPORT | POTENTIAL CUSTOMER REGISTER |

FIG. 6E

| # | | | | | | | | | | | | |
|---|---|---|---|---|---|---|---|---|---|---|---|---|
| 64 | PREPARATION AND REPORT OF ESTIMATE | O | | | ESTIMATE | ESTIMATE REGISTER | | | | | | |
| 65 | CORRECTION REPORT OF ESTIMATE | O | | | ESTIMATE | ESTIMATE REGISTER | | | | | | |
| 66 | CANCELLATION REPORT OF ESTIMATE | O | | | ESTIMATE | ESTIMATE REGISTER | | | | | | |
| 67 | REPORT OF POTENTIAL ORDER RECEPTION INFORMATION | O | | | POTENTIAL ORDER RECEPTION REPORT | POTENTIAL ORDER RECEPTION REGISTER | | | | | | |
| 68 | CORRECTION REPORT OF POTENTIAL ORDER RECEPTION INFORMATION | O | | | POTENTIAL ORDER RECEPTION REPORT | POTENTIAL ORDER RECEPTION REGISTER | | | | | | |
| 69 | CANCELLATION REPORT OF POTENTIAL ORDER RECEPTION INFORMATION | O | | | POTENTIAL ORDER RECEPTION REPORT | POTENTIAL ORDER RECEPTION REGISTER | | | | | | |
| 70 | ORDER RECEPTION CONTRACT (RESERVED) | O | | | RESERVATION SLIP | ORDER RECEPTION REGISTER | O | O | O | O | O | O |
| 71 | CORRECTION OF ORDER RECEPTION CONTRACT (RESERVED) | O | | | RESERVED CORRECTION SLIP | ORDER RECEPTION REGISTER | O | O | O | O | O | O |
| 72 | CANCELLATION OF ORDER RECEPTION CONTRACT (RESERVED) | O | | | RESERVED CANCELLATION SLIP | ORDER RECEPTION REGISTER | O | O | O | O | O | O |
| 73 | ORDER RECEPTION CONTRACT (UNOFFICIAL NOTIFICATION) | O | | | ORDER RECEPTION SLIP | ORDER RECEPTION REGISTER | O | O | O | O | O | O |
| 74 | CORRECTION OF ORDER RECEPTION CONTRACT (UNOFFICIAL NOTIFICATION) | O | | | ORDER RECEPTION CANCELLATION SLIP | ORDER RECEPTION REGISTER | O | O | O | O | O | O |
| 75 | CANCELLATION OF ORDER RECEPTION CONTRACT (UNOFFICIAL NOTIFICATION) | O | | | ORDER RECEPTION CANCELLATION SLIP | ORDER RECEPTION REGISTER | O | O | O | O | O | O |
| 76 | ORDER RECEPTION CONTRACT (SETTLED) | O | | | ORDER RECEPTION SLIP | ORDER RECEPTION REGISTER | O | O | O | O | O | O |

FIG. 6F

| # | Event | | Slip | Register | | | | |
|---|---|---|---|---|---|---|---|---|
| 77 | CORRECTION OF ORDER RECEPTION CONTRACT (SETTLED) | ○ | ORDER RECEPTION CORRECTION SLIP | ORDER RECEPTION REGISTER | | | ○ | ○ |
| 78 | CANCELLATION OF ORDER RECEPTION CONTRACT (SETTLED) | ○ | ORDER RECEPTION CANCELLATION SLIP | ORDER RECEPTION REGISTER | | | ○ | ○ |
| 79 | INSTRUCTION FOR SHIPMENT OF SALES MERCHANDISE | ○ | INSTRUCTION OF SHIPMENT OF SALES MERCHANDISE | SHIPMENT INSTRUCTION REGISTER | | | | |
| 80 | CORRECTION INSTRUCTION OF SHIPMENT OF SALES MERCHANDISE | ○ | SHIPMENT CORRECTION INSTRUCTION OF SALES MERCHANDISE | SHIPMENT INSTRUCTION REGISTER | | | | |
| 81 | CANCELLATION INSTRUCTION OF SHIPMENT OF SALES MERCHANDISE | ○ | SHIPMENT CANCELLATION INSTRUCTION OF SALES MERCHANDISE | SHIPMENT INSTRUCTION REGISTER | | | | |
| 82 | REPORT OF SHIPMENT RESULT OF SALES MERCHANDISE | ○ | SHIPMENT SLIP | SHIPMENT REGISTER | ○ | ○ | ○ | ○ |
| 83 | CORRECTION REPORT OF SHIPMENT RESULT OF SALES MERCHANDISE | ○ | SHIPMENT CORRECTION SLIP | SHIPMENT REGISTER | ○ | ○ | ○ | ○ |
| 84 | CANCELLATION REPORT OF SHIPMENT RESULT OF SALES MERCHANDISE | ○ | SHIPMENT CANCELLATION SLIP | SHIPMENT REGISTER | ○ | ○ | ○ | ○ |
| 85 | REPORT OF SHIPMENT RETURN RESULT OF SALES MERCHANDISE | ○ | SHIPMENT RETURN SLIP | SHIPMENT RETURN REGISTER | ○ | ○ | ○ | ○ |
| 86 | CORRECTION REPORT OF SHIPMENT RETURN RESULT OF SALES MERCHANDISE | ○ | SHIPMENT RETURN CORRECTION SLIP | SHIPMENT RETURN REGISTER | ○ | ○ | ○ | ○ |
| 87 | CANCELLATION REPORT OF SHIPMENT RETURN RESULT OF SALES MERCHANDISE | ○ | SHIPMENT RETURN CANCELLATION SLIP | SHIPMENT RETURN REGISTER | ○ | ○ | ○ | ○ |
| 88 | ISSUANCE OF BILL | ○ | BILLING SLIP | BILLING REGISTER | | | | |
| 89 | CORRECTION ISSUANCE OF BILL | ○ | BILLING CORRECTION SLIP | BILLING REGISTER | | | | |

| | | | | | | | | | | | | |
|---|---|---|---|---|---|---|---|---|---|---|---|---|
| 90 | ISSUANCE CANCELLATION OF BILL | ○ | | | | BILLING CANCELLATION SLIP | BILLING REGISTER | | ○ | | | |
| 91 | SALES SUMMING-UP | | ○ | | | SALES SUMMING-UP SLIP | GENERAL LEDGER | ○ | ○ | ○ | | |
| 92 | COLLECTION SUMMING-UP | | ○ | | | COLLECTION SUMMING-UP SLIP | GENERAL LEDGER | ○ | ○ | ○ | | |
| 93 | REPORT OF WAREHOUSING SCHEDULE OF SALES MERCHANDISE | | | ○ | | SALES MERCHANDISE WAREHOUSING SCHEDULE SLIP | SALES MERCHANDISE WAREHOUSING SCHEDULE TABLE | | | | | |
| 94 | CORRECTION REPORT OF WAREHOUSING SCHEDULE OF SALES MERCHANDISE | | | ○ | | SALES MERCHANDISE WAREHOUSING SCHEDULE CORRECTION SLIP | SALES MERCHANDISE WAREHOUSING SCHEDULE TABLE | | | | | |
| 95 | CANCELLATION REPORT OF WAREHOUSING SCHEDULE OF SALES MERCHANDISE | | | ○ | | SALES MERCHANDISE WAREHOUSING SCHEDULE CANCELLATION SLIP | SALES MERCHANDISE WAREHOUSING SCHEDULE TABLE | | | | | |
| 96 | REPORT OF WAREHOUSING RESULT OF SALES MERCHANDISE | | | ○ | | SALES MERCHANDISE WAREHOUSING SLIP | SALES MERCHANDISE WAREHOUSING REGISTER | ○ | ○ | ○ | ○ | ○ |
| 97 | CORRECTION REPORT OF WAREHOUSING RESULT OF SALES MERCHANDISE | | | ○ | | SALES MERCHANDISE WAREHOUSING CORRECTION SLIP | SALES MERCHANDISE WAREHOUSING REGISTER | ○ | ○ | ○ | ○ | ○ |
| 98 | CANCELLATION REPORT OF WAREHOUSING RESULT OF SALES MERCHANDISE | | | ○ | | SALES MERCHANDISE WAREHOUSING CANCELLATION SLIP | SALES MERCHANDISE WAREHOUSING REGISTER | ○ | ○ | ○ | ○ | ○ |
| 99 | REPORT OF INVENTORY OF SALES MERCHANDISE | | | ○ | | SALES MERCHANDISE INVENTORY SLIP | SALES MERCHANDISE INVENTORY REGISTER | ○ | ○ | ○ | ○ | ○ |
| 100 | CORRECTION REPORT OF INVENTORY OF SALES MERCHANDISE | | | ○ | | SALES MERCHANDISE INVENTORY CORRECTION SLIP | SALES MERCHANDISE INVENTORY REGISTER | ○ | ○ | ○ | ○ | ○ |
| 101 | CANCELLATION REPORT OF INVENTORY OF SALES MERCHANDISE | | | ○ | | SALES MERCHANDISE INVENTORY CANCELLATION SLIP | SALES MERCHANDISE INVENTORY REGISTER | ○ | ○ | ○ | ○ | ○ |
| 102 | REPORT OF STOCK WASTE OF SALES MERCHANDISE | | | ○ | | SALES MERCHANDISE STOCK WASTE SLIP | SALES MERCHANDISE STOCK WASTE REGISTER | ○ | ○ | ○ | ○ | ○ |
| 103 | CORRECTION REPORT OF STOCK WASTE OF SALES MERCHANDISE | | | ○ | | SALES MERCHANDISE STOCK WASTE CORRECTION SLIP | SALES MERCHANDISE STOCK WASTE REGISTER | ○ | ○ | ○ | ○ | ○ |

| | | | Slip | Register | | | | |
|---|---|---|---|---|---|---|---|---|
| 104 | CANCELLATION REPORT OF STOCK WASTE OF SALES MERCHANDISE | | SALES MERCHANDISE STOCK WASTE CANCELLATION SLIP | SALES MERCHANDISE STOCK WASTE REGISTER | ○ | | | ○ |
| 105 | REPORT OF DISPATCH SCHEDULE OF SALES MERCHANDISE | ○ | | SALES MERCHANDISE DISPATCH SCHEDULE SLIP | SALES MERCHANDISE DISPATCH SCHEDULE TABLE | | | | |
| 106 | CORRECTION REPORT OF DISPATCH SCHEDULE OF SALES MERCHANDISE | ○ | | SALES MERCHANDISE DISPATCH SCHEDULE CORRECTION SLIP | SALES MERCHANDISE DISPATCH SCHEDULE TABLE | | | | |
| 107 | CANCELLATION REPORT OF DISPATCH SCHEDULE OF SALES MERCHANDISE | ○ | | SALES MERCHANDISE DISPATCH SCHEDULE CANCELLATION SLIP | SALES MERCHANDISE DISPATCH SCHEDULE TABLE | | | | |
| 108 | REPORT OF DISPATCH RESULT OF SALES MERCHANDISE | ○ | | SALES MERCHANDISE DISPATCH SLIP | SALES MERCHANDISE DISPATCH REGISTER | ○ | ○ | ○ | ○ |
| 109 | CORRECTION REPORT OF DISPATCH RESULT OF SALES MERCHANDISE | ○ | | SALES MERCHANDISE DISPATCH CORRECTION SLIP | SALES MERCHANDISE DISPATCH REGISTER | ○ | ○ | ○ | ○ |
| 110 | CANCELLATION REPORT OF DISPATCH RESULT OF SALES MERCHANDISE | ○ | | SALES MERCHANDISE DISPATCH CANCELLATION SLIP | SALES MERCHANDISE DISPATCH REGISTER | ○ | ○ | ○ | ○ |
| 111 | SUMMING-UP OF SALES MERCHANDISE STOCK | | ○ | SALES MERCHANDISE STOCK SUMMING-UP SLIP | GENERAL LEDGER | ○ | ○ | ○ | ○ |
| 112 | OPENING OF TRANSACTION ACCOUNT OF SUPPLIER | ○ | | SUPPLIER ACCOUNT OPENING SLIP | SUPPLIER REGISTER | ○ | ○ | ○ | ○ |
| 113 | STOP OF TRANSACTION ACCOUNT OF SUPPLIER | ○ | | SUPPLIER ACCOUNT TRANSACTION STOP SLIP | SUPPLIER REGISTER | ○ | ○ | ○ | ○ |
| 114 | RESTART OF TRANSACTION FOR TRANSACTION ACCOUNT OF SUPPLIER | ○ | | SUPPLIER ACCOUNT TRANSACTION RESTART SLIP | SUPPLIER REGISTER | ○ | ○ | ○ | ○ |
| 115 | ABANDONMENT OF TRANSACTION ACCOUNT OF SUPPLIER | ○ | | SUPPLIER ACCOUNT TRANSACTION ABANDONMENT SLIP | SUPPLIER REGISTER | ○ | ○ | ○ | ○ |
| 116 | RESTORATION OF TRANSACTION ACCOUNT OF SUPPLIER | ○ | | SUPPLIER ACCOUNT TRANSACTION RESTORATION SLIP | SUPPLIER REGISTER | ○ | ○ | ○ | ○ |

| # | Process | ○ | Data Item (center) | Data Item (right) | ○ | ○ | ○ | ○ | ○ |
|---|---|---|---|---|---|---|---|---|---|
| 117 | SETTING OF ORGANIZATION OF SUPPLIER | ○ | ORGANIZATION CHART OF SUPPLIER | ORGANIZATION CHART OF SUPPLIER | | | | | |
| 118 | SETTING OF BILLING PERIOD OF SUPPLIER | ○ | BILLING PERIOD OF SUPPLIER | BILLING PERIOD OF SUPPLIER | | | | | |
| 119 | SETTING OF DEADLINE OF SUPPLIER | ○ | DEADLINE OF SUPPLIER | DEADLINE OF SUPPLIER | | | | | |
| 120 | SETTING OF MERCHANDISE ORDER ALLOTMENT AMOUNT OF SUPPLIER | ○ | SUPPLIER'S MERCHANDISE ORDER ALLOTMENT AMOUNT TABLE | SUPPLIER'S MERCHANDISE ORDER ALLOTMENT AMOUNT TABLE | | | | | |
| 121 | SETTING OF PURCHASE LIMIT AMOUNT OF SUPPLIER | ○ | SUPPLIER'S PURCHASE LIMIT AMOUNT TABLE | SUPPLIER'S PURCHASE LIMIT AMOUNT TABLE | | | | | |
| 122 | SETTING OF BUSINESS DAY OF SUPPLIER | ○ | SUPPLIER BUSINESS DAY CALENDAR | SUPPLIER BUSINESS DAY CALENDAR | | | | | |
| 123 | SETTING OF DATE OF PAYMENT SCHEDULE OF SUPPLIER | ○ | SUPPLIER PAYMENT SCHEDULE DATE | SUPPLIER PAYMENT SCHEDULE DATE | ○ | | | | |
| 124 | REGISTRATION OF PURCHASE OF PURCHASE MERCHANDISE | ○ | PURCHASE MERCHANDISE PURCHASE START SLIP | PURCHASE MERCHANDISE REGISTER | ○ | ○ | ○ | ○ | ○ |
| 125 | STOP OF PURCHASE OF PURCHASE MERCHANDISE | ○ | PURCHASE MERCHANDISE STOP SLIP | PURCHASE MERCHANDISE REGISTER | ○ | ○ | ○ | ○ | ○ |
| 126 | RESTART OF PURCHASE OF PURCHASE MERCHANDISE | ○ | PURCHASE MERCHANDISE RESTART SLIP | PURCHASE MERCHANDISE REGISTER | ○ | ○ | ○ | ○ | ○ |
| 127 | ABANDONMENT OF PURCHASE OF PURCHASE MERCHANDISE | ○ | PURCHASE MERCHANDISE ABANDONMENT SLIP | PURCHASE MERCHANDISE REGISTER | ○ | ○ | ○ | ○ | ○ |
| 128 | RESTORATION OF PURCHASE OF PURCHASE MERCHANDISE | ○ | PURCHASE MERCHANDISE RESTORATION SLIP | PURCHASE MERCHANDISE REGISTER | ○ | ○ | ○ | ○ | ○ |
| 129 | SETTING OF TIME REQUIRED FOR SUPPLYING PURCHASE MERCHANDISE | ○ | TIME REQUIRED FOR SUPPLYING PURCHASE MERCHANDISE | TIME REQUIRED FOR SUPPLYING PURCHASE MERCHANDISE | | | | | |
| 130 | SETTING OF STOCK LIMIT OF PURCHASE MERCHANDISE | ○ | STOCK LIMIT OF PURCHASE MERCHANDISE | STOCK LIMIT OF PURCHASE MERCHANDISE | | | | | |

| # | Item | | ○ column description | Right column description |
|---|---|---|---|---|
| 131 | SETTING OF APPROPRIATE STOCK OF PURCHASE MERCHANDISE | ○ | APPROPRIATE STOCK OF PURCHASE MERCHANDISE | APPROPRIATE STOCK OF PURCHASE MERCHANDISE |
| 132 | SETTING OF PURCHASE PRICE OF PURCHASE MERCHANDISE | ○ | PURCHASE MERCHANDISE PURCHASE PRICE SETTING SLIP | PURCHASE MERCHANDISE PURCHASE PRICE REGISTER |
| 133 | SETTING OF ORDERING POINT MERCHANDISE | ○ | ORDERING POINT OF PURCHASE MERCHANDISE | ORDERING POINT OF PURCHASE MERCHANDISE |
| 134 | SETTING OF QUANTITY DISCOUNT PRICE OF PURCHASE MERCHANDISE | ○ | PURCHASE MERCHANDISE QUANTITY DISCOUNT PRICE SETTING SLIP | PURCHASE MERCHANDISE QUANTITY DISCOUNT PRICE LIST |
| 135 | SETTING OF SUPPLY LOT OF PURCHASE MERCHANDISE | ○ | SUPPLY LOT OF PURCHASE MERCHANDISE | SUPPLY LOT OF PURCHASE MERCHANDISE |
| 136 | SETTING OF RECEPTION LOT OF PURCHASE MERCHANDISE | ○ | RECEPTION LOT OF PURCHASE MERCHANDISE | RECEPTION LOT OF PURCHASE MERCHANDISE |
| 137 | SETTING OF PURCHASE PLAN OF PURCHASE MERCHANDISE | ○ | PURCHASE SCHEDULE OF PURCHASE MERCHANDISE | PURCHASE SCHEDULE OF PURCHASE MERCHANDISE |
| 138 | REGISTRATION OF PURCHASE MERCHANDISE OF EACH SUPPLIER | ○ | PURCHASE START SLIP FOR SUPPLIER OF PURCHASE MERCHANDISE | REGISTER OF SUPPLIER OF PURCHASE MERCHANDISE |
| 139 | STOP OF PURCHASE MERCHANDISE OF EACH SUPPLIER | ○ | PURCHASE STOP SLIP FOR SUPPLIER OF PURCHASE MERCHANDISE | REGISTER OF SUPPLIER OF PURCHASE MERCHANDISE |
| 140 | RESTART OF PURCHASE MERCHANDISE OF EACH SUPPLIER | ○ | PURCHASE RESTART SLIP FOR SUPPLIER OF PURCHASE MERCHANDISE | REGISTER OF SUPPLIER OF PURCHASE MERCHANDISE |
| 141 | ABANDONMENT OF PURCHASE OF MERCHANDISE OF EACH SUPPLIER | ○ | PURCHASE ABANDONMENT SLIP FOR SUPPLIER OF PURCHASE MERCHANDISE | REGISTER OF SUPPLIER OF PURCHASE MERCHANDISE |

FIG. 6K

| | | | | | |
|---|---|---|---|---|---|
| 142 | RESTORATION OF PURCHASE OF MERCHANDISE OF EACH SUPPLIER | | ○ | PURCHASE RESTORATION SLIP FOR SUPPLIER OF PURCHASE MERCHANDISE | REGISTER OF SUPPLIER OF PURCHASE MERCHANDISE |
| 143 | SETTING OF PURCHASE PRICE OF PURCHASE MERCHANDISE OF EACH SUPPLIER | | ○ | PURCHASE PRICE LIST OF PURCHASE MERCHANDISE OF SUPPLIER | PURCHASE PRICE LIST OF PURCHASE MERCHANDISE OF SUPPLIER |
| 144 | SETTING OF QUANTITY DISCOUNT PRICE OF PURCHASE MERCHANDISE OF EACH SUPPLIER | | ○ | QUANTITY DISCOUNT PRICE LIST OF PURCHASE MERCHANDISE OF SUPPLIER | QUANTITY DISCOUNT PRICE LIST OF PURCHASE MERCHANDISE OF SUPPLIER |
| 145 | SETTING OF PURCHASE QUANTITY ALLOTMENT OF PURCHASE MERCHANDISE OF SUPPLIER | | ○ | PURCHASE QUANTITY ALLOTMENT TABLE OF PURCHASE MERCHANDISE OF SUPPLIER | PURCHASE QUANTITY ALLOTMENT TABLE OF PURCHASE MERCHANDISE OF SUPPLIER |
| 146 | REGISTRATION OF PAYMENT TRANSACTION FOR BANKING ORGANIZATION ACCOUNT OF SUPPLIER | | ○ | BANKING ORGANIZATION ACCOUNT REGISTRATION SLIP OF SUPPLIER | BANKING ORGANIZATION ACCOUNT REGISTER OF SUPPLIER PAYMENT |
| 147 | STOP OF PAYMENT TRANSACTION FOR BANKING ORGANIZATION ACCOUNT OF SUPPLIER | | ○ | BANKING ORGANIZATION ACCOUNT STOP SLIP OF SUPPLIER PAYMENT | BANKING ORGANIZATION ACCOUNT REGISTER OF SUPPLIER PAYMENT |
| 148 | RESTART OF PAYMENT TRANSACTION FOR BANKING ORGANIZATION ACCOUNT | | ○ | BANKING ORGANIZATION ACCOUNT RESTART SLIP OF SUPPLIER PAYMENT | BANKING ORGANIZATION ACCOUNT REGISTER OF SUPPLIER PAYMENT |
| 149 | ABANDONMENT OF PAYMENT TRANSACTION FOR BANKING ORGANIZATION ACCOUNT | | ○ | BANKING ORGANIZATION ACCOUNT ABANDONMENT SLIP OF SUPPLIER PAYMENT | BANKING ORGANIZATION ACCOUNT REGISTER OF SUPPLIER PAYMENT |
| 150 | RESTORATION OF PAYMENT TRANSACTION FOR BANKING ORGANIZATION ACCOUNT | | ○ | BANKING ORGANIZATION ACCOUNT RESTORATION SLIP OF SUPPLIER PAYMENT | BANKING ORGANIZATION ACCOUNT REGISTER OF SUPPLIER PAYMENT |
| 151 | ISSUANCE OF WRITTEN ESTIMATE REQUEST | | | WRITTEN ESTIMATE REQUEST | WRITTEN ESTIMATE REQUEST REGISTER |

FIG. 6L

| | | | | | | | | | | | | | |
|---|---|---|---|---|---|---|---|---|---|---|---|---|---|
| 152 | CORRECTION OF ISSUANCE OF WRITTEN ESTIMATE REQUEST | O | | WRITTEN ESTIMATE REQUEST | WRITTEN ESTIMATE REQUEST REGISTER | | | | | | | | |
| 153 | CANCELLATION OF ISSUANCE OF WRITTEN ESTIMATE REQUEST | O | | WRITTEN ESTIMATE REQUEST | WRITTEN ESTIMATE REQUEST REGISTER | | | | | | | | |
| 154 | ISSUANCE OF POTENTIAL ORDER REPORT | O | | POTENTIAL ORDER REPORT | POTENTIAL ORDER REGISTER | | | | | | | | |
| 155 | CORRECTION OF ISSUANCE OF ORDER-TO-BE-MADE REPORT | O | | POTENTIAL ORDER REPORT | POTENTIAL ORDER REGISTER | | | | | | | | |
| 156 | CANCELLATION OF ISSUANCE OF POTENTIAL ORDER REPORT | O | | POTENTIAL ORDER REPORT | POTENTIAL ORDER REGISTER | | | | | | | | |
| 157 | ORDERING CONTRACT | O | | ORDERING SLIP | ORDERING REGISTER | O | | | | | | | |
| 158 | CORRECTION OF ORDERING CONTRACT | O | | ORDERING CORRECTION SLIP | ORDERING REGISTER | O | O | | | | | | |
| 159 | CANCELLATION OF ORDERING CONTRACT | O | | ORDERING CANCELLATION SLIP | ORDERING REGISTER | O | O | O | | | | | |
| 160 | ORDERING CONTRACT (REGULAR ORDER) | O | | ORDERING SLIP (REGULAR ORDER) | ORDERING REGISTER | O | O | O | O | | | | |
| 161 | CORRECTION OF ORDERING CONTRACT (REGULAR ORDER) | O | | ORDERING CORRECTION SLIP (REGULAR ORDER) | ORDERING REGISTER | O | O | O | O | O | | | |
| 162 | CANCELLATION OF ORDERING CONTRACT (REGULAR ORDER) | O | | ORDERING CANCELLATION SLIP (REGULAR ORDER) | ORDERING REGISTER | O | O | O | O | O | O | | |
| 163 | ORDERING CONTRACT (PRE-ARRANGEMENT) | O | | ORDERING SLIP (PRE-ARRANGEMENT) | ORDERING REGISTER | O | O | O | O | O | O | O | |
| 164 | CORRECTION OF ORDERING CONTRACT (PRE-ARRANGEMENT) | O | | ORDERING CORRECTION SLIP (PRE-ARRANGEMENT) | ORDERING REGISTER | O | O | O | O | O | O | O | O |
| 165 | CANCELLATION OF ORDERING CONTRACT (PRE-ARRANGEMENT) | O | | ORDERING CANCELLATION SLIP (PRE-ARRANGEMENT) | ORDERING REGISTER | O | O | O | O | O | O | O | O |

| | | Slip | Register | | | | | |
|---|---|---|---|---|---|---|---|---|
| 166 | INSTRUCTION FOR WAREHOUSING OF PURCHASE MERCHANDISE | ○ | WRITTEN WAREHOUSING INSTRUCTION | WAREHOUSING INSTRUCTION REGISTER | | | | |
| 167 | CORRECTION INSTRUCTION OF WAREHOUSING OF PURCHASE MERCHANDISE | ○ | WRITTEN WAREHOUSING CORRECTION INSTRUCTION | WAREHOUSING INSTRUCTION REGISTER | | | | |
| 168 | CANCELLATION INSTRUCTION OF WAREHOUSING OF PURCHASE MERCHANDISE | ○ | WRITTEN WAREHOUSING INSTRUCTION | WAREHOUSING INSTRUCTION REGISTER | | | | |
| 169 | REPORT OF WAREHOUSING RESULT OF PURCHASE MERCHANDISE | ○ | WAREHOUSING SLIP | WAREHOUSING REGISTER | ○ | ○ | ○ | ○ |
| 170 | CORRECTION REPORT OF WAREHOUSING RESULT OF PURCHASE MERCHANDISE | ○ | WAREHOUSING CORRECTION SLIP | WAREHOUSING REGISTER | ○ | ○ | ○ | ○ |
| 171 | CANCELLATION REPORT OF WAREHOUSING RESULT OF PURCHASE MERCHANDISE | ○ | WAREHOUSING CANCELLATION SLIP | WAREHOUSING REGISTER | ○ | ○ | ○ | ○ |
| 172 | REPORT OF WAREHOUSING RETURN RESULT OF PURCHASE MERCHANDISE | ○ | WAREHOUSING RETURN SLIP | WAREHOUSING RETURN REGISTER | ○ | ○ | ○ | ○ |
| 173 | CORRECTION REPORT OF WAREHOUSING RETURN RESULT OF PURCHASE MERCHANDISE | ○ | WAREHOUSING RETURN CORRECTION SLIP | WAREHOUSING RETURN REGISTER | ○ | ○ | ○ | ○ |
| 174 | CANCELLATION REPORT OF WAREHOUSING RETURN RESULT OF PURCHASE MERCHANDISE | ○ | WAREHOUSING RETURN CANCELLATION SLIP | WAREHOUSING RETURN REGISTER | ○ | ○ | ○ | ○ |
| 175 | REPORT OF STOCKING BILLING CONFIRMATION | ○ | STOCKING BILL | WRITTEN STOCKING BILLING CONFIRMATION | | | | |
| 176 | CORRECTION REPORT OF STOCKING BILLING CONFIRMATION | ○ | STOCKING BILL | WRITTEN STOCKING BILLING CONFIRMATION | | | | |

| # | Report Name | | | | | Stocking Bill | Written Stocking Billing Confirmation | | | | | | |
|---|---|---|---|---|---|---|---|---|---|---|---|---|---|
| 177 | CANCELLATION REPORT OF STOCKING BILLING CONFIRMATION | ○ | | | | | | | | | | | |
| 178 | STOCKING SUMMING-UP | | | | ○ | STOCKING SUMMING-UP SLIP | GENERAL LEDGER | ○ | ○ | ○ | ○ | | |
| 179 | PAYMENT SUMMING-UP | | | | ○ | PAYMENT SUMMING-UP SLIP | GENERAL LEDGER | ○ | ○ | ○ | ○ | | |
| 180 | REPORT OF WAREHOUSING SCHEDULE OF PURCHASE MERCHANDISE | | ○ | | | PURCHASE MERCHANDISE WAREHOUSING SCHEDULE SLIP | PURCHASE MERCHANDISE WAREHOUSING SCHEDULE TABLE | | | | | | |
| 181 | CORRECTION REPORT OF WAREHOUSING SCHEDULE OF PURCHASE MERCHANDISE | | ○ | | | PURCHASE MERCHANDISE WAREHOUSING SCHEDULE CORRECTION SLIP | PURCHASE MERCHANDISE WAREHOUSING SCHEDULE TABLE | | | | | | |
| 182 | CANCELLATION REPORT OF WAREHOUSING SCHEDULE OF PURCHASE MERCHANDISE | | ○ | | | PURCHASE MERCHANDISE WAREHOUSING SCHEDULE CANCELLATION SLIP | PURCHASE MERCHANDISE WAREHOUSING SCHEDULE TABLE | | | | | | |
| 183 | REPORT OF WAREHOUSING RESULT OF PURCHASE MERCHANDISE | | ○ | | | PURCHASE MERCHANDISE WAREHOUSING SLIP | PURCHASE MERCHANDISE WAREHOUSING REGISTER | ○ | ○ | ○ | ○ | ○ | ○ |
| 184 | CORRECTION REPORT OF WAREHOUSING RESULT OF PURCHASE MERCHANDISE | | ○ | | | PURCHASE MERCHANDISE WAREHOUSING CORRECTION SLIP | PURCHASE MERCHANDISE WAREHOUSING REGISTER | ○ | ○ | ○ | ○ | ○ | ○ |
| 185 | CANCELLATION REPORT OF WAREHOUSING RESULT OF PURCHASE MERCHANDISE | | ○ | | | PURCHASE MERCHANDISE WAREHOUSING CANCELLATION SLIP | PURCHASE MERCHANDISE WAREHOUSING REGISTER | ○ | ○ | ○ | ○ | ○ | ○ |
| 186 | REPORT OF INVENTORY OF PURCHASE MERCHANDISE | | ○ | | | PURCHASE MERCHANDISE INVENTORY SLIP | PURCHASE MERCHANDISE INVENTORY REGISTER | ○ | ○ | ○ | ○ | ○ | ○ |
| 187 | CORRECTION REPORT OF INVENTORY OF PURCHASE MERCHANDISE | | ○ | | | PURCHASE MERCHANDISE INVENTORY CORRECTION SLIP | PURCHASE MERCHANDISE INVENTORY REGISTER | ○ | ○ | ○ | ○ | ○ | ○ |
| 188 | CANCELLATION REPORT OF INVENTORY OF PURCHASE MERCHANDISE | | ○ | | | PURCHASE MERCHANDISE INVENTORY CANCELLATION SLIP | PURCHASE MERCHANDISE INVENTORY REGISTER | ○ | ○ | ○ | ○ | ○ | ○ |

FIG. 60

| # | Description | | | Slip | Register | | | | |
|---|---|---|---|---|---|---|---|---|---|
| 189 | REPORT OF STOCK WASTE OF PURCHASE MERCHANDISE | ○ | | PURCHASE MERCHANDISE STOCK WASTE SLIP | PURCHASE MERCHANDISE STOCK WASTE REGISTER | ○ | ○ | ○ | ○ |
| 190 | CORRECTION REPORT OF STOCK WASTE OF PURCHASE MERCHANDISE | ○ | | PURCHASE MERCHANDISE STOCK WASTE CORRECTION SLIP | PURCHASE MERCHANDISE STOCK WASTE REGISTER | ○ | ○ | ○ | ○ |
| 191 | CANCELLATION REPORT OF STOCK WASTE OF PURCHASE MERCHANDISE | ○ | | PURCHASE MERCHANDISE STOCK WASTE CANCELLATION SLIP | PURCHASE MERCHANDISE STOCK WASTE REGISTER | ○ | ○ | ○ | ○ |
| 192 | REPORT OF DISPATCH SCHEDULE OF PURCHASE MERCHANDISE | ○ | | PURCHASE MERCHANDISE DISPATCH SCHEDULE SLIP | PURCHASE MERCHANDISE DISPATCH SCHEDULE TABLE | | | | |
| 193 | CORRECTION REPORT OF DISPATCH SCHEDULE OF PURCHASE MERCHANDISE | ○ | | PURCHASE MERCHANDISE DISPATCH SCHEDULE CORRECTION SLIP | PURCHASE MERCHANDISE DISPATCH SCHEDULE TABLE | | | | |
| 194 | CANCELLATION REPORT OF DISPATCH SCHEDULE OF PURCHASE MERCHANDISE | ○ | | PURCHASE MERCHANDISE DISPATCH SCHEDULE CANCELLATION SLIP | PURCHASE MERCHANDISE DISPATCH SCHEDULE TABLE | | | | |
| 195 | REPORT OF DISPATCH RESULT OF PURCHASE MERCHANDISE | ○ | | PURCHASE MERCHANDISE DISPATCH SLIP | PURCHASE MERCHANDISE DISPATCH REGISTER | ○ | ○ | ○ | ○ |
| 196 | CORRECTION REPORT OF DISPATCH RESULT OF PURCHASE MERCHANDISE | ○ | | PURCHASE MERCHANDISE DISPATCH CORRECTION SLIP | PURCHASE MERCHANDISE DISPATCH REGISTER | ○ | ○ | ○ | ○ |
| 197 | CANCELLATION REPORT OF DISPATCH RESULT OF PURCHASE MERCHANDISE | ○ | | PURCHASE MERCHANDISE DISPATCH CANCELLATION SLIP | PURCHASE MERCHANDISE DISPATCH REGISTER | ○ | ○ | ○ | ○ |
| 198 | INVENTORY OF PURCHASE MERCHANDISE | | ○ | PURCHASE MERCHANDISE INVENTORY SLIP | GENERAL LEDGER | ○ | ○ | ○ | ○ |
| 199 | REGISTRATION OF PRODUCTION OF PRODUCT | ○ | | PRODUCT PRODUCTION START SLIP | PRODUCT REGISTER | ○ | ○ | ○ | ○ |
| 200 | STOP OF PRODUCTION OF PRODUCT | ○ | | PRODUCT PRODUCTION STOP SLIP | PRODUCT REGISTER | ○ | ○ | ○ | ○ |
| 201 | RESTART OF PRODUCTION OF PRODUCT | ○ | | PRODUCT PRODUCTION RESTART SLIP | PRODUCT REGISTER | ○ | ○ | ○ | ○ |

| # | Report/Action | Slip | Register/Table |
|---|---|---|---|
| 202 | ABANDONMENT OF PRODUCTION OF PRODUCT | PRODUCT PRODUCTION ABANDONMENT SLIP | PRODUCT REGISTER |
| 203 | RESTORATION OF PRODUCTION OF PRODUCT | PRODUCT PRODUCTION RESTORATION SLIP | PRODUCT REGISTER |
| 204 | REPORT OF PRODUCTION PLAN | PRODUCTION PLAN TABLE | PRODUCTION PLAN TABLE |
| 205 | CORRECTION REPORT OF PRODUCTION PLAN | PRODUCTION PLAN TABLE | PRODUCTION PLAN TABLE |
| 206 | CANCELLATION REPORT OF PRODUCTION PLAN | PRODUCTION PLAN TABLE | PRODUCTION PLAN TABLE |
| 207 | REGISTRATION OF MANUFACTURING PROCESS | MANUFACTURING PROCESS CHART | MANUFACTURING PROCESS CHART |
| 208 | CORRECTION OF MANUFACTURING PROCESS | MANUFACTURING PROCESS CHART | MANUFACTURING PROCESS CHART |
| 209 | CANCELLATION OF MANUFACTURING PROCESS | MANUFACTURING PROCESS CHART | MANUFACTURING PROCESS CHART |
| 210 | REPORT OF WAREHOUSING SCHEDULE OF MATERIAL | MATERIAL WAREHOUSING SCHEDULE SLIP | MATERIAL WAREHOUSING SCHEDULE TABLE |
| 211 | CORRECTION REPORT OF WAREHOUSING SCHEDULE OF MATERIAL | MATERIAL WAREHOUSING SCHEDULE CORRECTION SLIP | MATERIAL WAREHOUSING SCHEDULE TABLE |
| 212 | CANCELLATION REPORT OF WAREHOUSING SCHEDULE OF MATERIAL | MATERIAL WAREHOUSING SCHEDULE CANCELLATION SLIP | MATERIAL WAREHOUSING SCHEDULE TABLE |
| 213 | REPORT OF WAREHOUSING RESULT OF MATERIAL | MATERIAL WAREHOUSING SLIP | MATERIAL WAREHOUSING REGISTER |
| 214 | CORRECTION REPORT OF WAREHOUSING RESULT OF MATERIAL | MATERIAL WAREHOUSING CORRECTION SLIP | MATERIAL WAREHOUSING REGISTER |
| 215 | CANCELLATION REPORT OF WAREHOUSING RESULT OF MATERIAL | MATERIAL WAREHOUSING CANCELLATION SLIP | MATERIAL WAREHOUSING REGISTER |
| 216 | REPORT OF INVENTORY OF MATERIAL | MATERIAL INVENTORY SLIP | MATERIAL INVENTORY REGISTER |
| 217 | CORRECTION REPORT OF INVENTORY OF MATERIAL | MATERIAL INVENTORY CORRECTION SLIP | MATERIAL INVENTORY REGISTER |

| # | Report | | Slip | Register | | | | |
|---|---|---|---|---|---|---|---|---|
| 218 | CANCELLATION REPORT OF INVENTORY OF MATERIAL | O | MATERIAL INVENTORY CANCELLATION SLIP | MATERIAL INVENTORY REGISTER | O | O | O | |
| 219 | REPORT OF STOCK WASTE OF MATERIAL | O | MATERIAL STOCK WASTE SLIP | MATERIAL STOCK WASTE REGISTER | O | O | O | |
| 220 | CORRECTION REPORT OF STOCK WASTE OF MATERIAL | O | MATERIAL STOCK WASTE CORRECTION SLIP | MATERIAL STOCK WASTE REGISTER | O | O | O | |
| 221 | CANCELLATION REPORT OF STOCK WASTE OF MATERIAL | O | MATERIAL STOCK WASTE CANCELLATION SLIP | MATERIAL STOCK WASTE REGISTER | O | O | O | |
| 222 | REPORT OF DISPATCH SCHEDULE OF MATERIAL | O | MATERIAL DISPATCH SCHEDULE SLIP | MATERIAL DISPATCH SCHEDULE TABLE | | | | |
| 223 | CORRECTION REPORT OF DISPATCH SCHEDULE OF MATERIAL | O | MATERIAL DISPATCH SCHEDULE CORRECTION SLIP | MATERIAL DISPATCH SCHEDULE TABLE | | | | |
| 224 | CANCELLATION REPORT OF DISPATCH SCHEDULE OF MATERIAL | O | MATERIAL DISPATCH SCHEDULE CANCELLATION SLIP | MATERIAL DISPATCH SCHEDULE TABLE | | | | |
| 225 | REPORT OF DISPATCH RESULT OF MATERIAL | O | MATERIAL DISPATCH SLIP | MATERIAL DISPATCH REGISTER | O | O | O | |
| 226 | CORRECTION REPORT OF DISPATCH RESULT OF MATERIAL | O | MATERIAL DISPATCH CORRECTION SLIP | MATERIAL DISPATCH REGISTER | O | O | O | |
| 227 | CANCELLATION REPORT OF DISPATCH RESULT OF MATERIAL | O | MATERIAL DISPATCH CANCELLATION SLIP | MATERIAL DISPATCH REGISTER | O | O | O | |
| 228 | REPORT OF WAREHOUSING SCHEDULE OF MATERIAL | O | MATERIAL WAREHOUSING SCHEDULE SLIP | MATERIAL WAREHOUSING SCHEDULE REGISTER | | | | |
| 229 | CORRECTION REPORT OF WAREHOUSING SCHEDULE OF MATERIAL | O | MATERIAL WAREHOUSING SCHEDULE CORRECTION SLIP | MATERIAL WAREHOUSING SCHEDULE REGISTER | | | | |
| 230 | CANCELLATION REPORT OF WAREHOUSING SCHEDULE OF MATERIAL | O | MATERIAL WAREHOUSING SCHEDULE CANCELLATION SLIP | MATERIAL WAREHOUSING SCHEDULE REGISTER | | | | |
| 231 | REPORT OF WAREHOUSING RESULT OF MATERIAL | O | MATERIAL WAREHOUSING SLIP | MATERIAL WAREHOUSING REGISTER | O | O | | O |

| No. | Report | | | | | Slip | Register | | | | | | | | | | |
|---|---|---|---|---|---|---|---|---|---|---|---|---|---|---|---|---|---|
| 232 | CORRECTION REPORT OF WAREHOUSING RESULT OF MATERIAL | | | | ○ | MATERIAL WAREHOUSING CORRECTION SLIP | MATERIAL WAREHOUSING REGISTER | ○ | ○ | ○ | ○ | | | ○ | ○ | ○ | |
| 233 | CANCELLATION REPORT OF WAREHOUSING RESULT OF MATERIAL | | | | ○ | MATERIAL WAREHOUSING CANCELLATION SLIP | MATERIAL WAREHOUSING REGISTER | ○ | ○ | ○ | ○ | | | ○ | ○ | ○ | |
| 234 | REPORT OF INVENTORY OF MATERIAL | | | | ○ | MATERIAL INVENTORY SLIP | MATERIAL INVENTORY REGISTER | ○ | ○ | ○ | ○ | | | ○ | ○ | ○ | |
| 235 | CORRECTION REPORT OF INVENTORY OF MATERIAL | | | | ○ | MATERIAL INVENTORY CORRECTION SLIP | MATERIAL INVENTORY REGISTER | ○ | ○ | ○ | ○ | | | ○ | ○ | ○ | |
| 236 | CANCELLATION REPORT OF INVENTORY OF MATERIAL | | | | ○ | MATERIAL INVENTORY CANCELLATION SLIP | MATERIAL INVENTORY REGISTER | ○ | ○ | ○ | ○ | | | ○ | ○ | ○ | |
| 237 | REPORT OF STOCK WASTE OF MATERIAL | | | | ○ | MATERIAL STOCK WASTE SLIP | MATERIAL STOCK WASTE REGISTER | ○ | ○ | ○ | ○ | | | | | | |
| 238 | CORRECTION REPORT OF STOCK WASTE OF MATERIAL | | | | ○ | MATERIAL STOCK WASTE CORRECTION SLIP | MATERIAL STOCK WASTE REGISTER | ○ | ○ | ○ | ○ | | | | | | |
| 239 | CANCELLATION REPORT OF STOCK WASTE OF MATERIAL | | | | ○ | MATERIAL STOCK WASTE CANCELLATION SLIP | MATERIAL STOCK WASTE REGISTER | ○ | ○ | | | | | | | | |
| 240 | REPORT OF DISPATCH SCHEDULE OF MATERIAL | | | | ○ | MATERIAL DISPATCH SCHEDULE SLIP | MATERIAL DISPATCH SCHEDULE TABLE | ○ | | | | | | | | | |
| 241 | CORRECTION REPORT OF DISPATCH SCHEDULE OF MATERIAL | | | | ○ | MATERIAL DISPATCH SCHEDULE CORRECTION SLIP | MATERIAL DISPATCH SCHEDULE TABLE | ○ | | | | | | | | | |
| 242 | CANCELLATION REPORT OF DISPATCH SCHEDULE OF MATERIAL | | | | ○ | MATERIAL DISPATCH SCHEDULE CANCELLATION SLIP | MATERIAL DISPATCH SCHEDULE TABLE | ○ | | | | | | | | | |
| 243 | REPORT OF DISPATCH RESULT OF MATERIAL | | | | ○ | MATERIAL DISPATCH SLIP | MATERIAL DISPATCH REGISTER | ○ | ○ | ○ | ○ | | | ○ | ○ | ○ | |
| 244 | CORRECTION REPORT OF DISPATCH RESULT OF MATERIAL | | | | ○ | MATERIAL DISPATCH CORRECTION SLIP | MATERIAL DISPATCH REGISTER | ○ | ○ | ○ | ○ | | | ○ | ○ | ○ | |
| 245 | CANCELLATION REPORT OF DISPATCH RESULT OF MATERIAL | | | | ○ | MATERIAL DISPATCH CANCELLATION SLIP | MATERIAL DISPATCH REGISTER | ○ | ○ | ○ | ○ | | | ○ | ○ | ○ | |

| # | Report | | Slip | Register/Table | | | |
|---|---|---|---|---|---|---|---|
| 246 | REPORT OF WAREHOUSING SCHEDULE OF PARTS | ○ | PARTS WAREHOUSING SCHEDULE SLIP | PARTS WAREHOUSING SCHEDULE TABLE | | | |
| 247 | CORRECTION REPORT OF WAREHOUSING SCHEDULE OF PARTS | ○ | PARTS WAREHOUSING SCHEDULE CORRECTION SLIP | PARTS WAREHOUSING SCHEDULE TABLE | | | |
| 248 | CANCELLATION REPORT OF WAREHOUSING SCHEDULE OF PARTS | ○ | PARTS WAREHOUSING SCHEDULE CANCELLATION SLIP | PARTS WAREHOUSING SCHEDULE TABLE | | | |
| 249 | REPORT OF WAREHOUSING RESULT OF PARTS | ○ | PARTS WAREHOUSING SLIP | PARTS WAREHOUSING REGISTER | ○ | ○ | ○ |
| 250 | CORRECTION REPORT OF WAREHOUSING RESULT OF PARTS | ○ | PARTS WAREHOUSING CORRECTION SLIP | PARTS WAREHOUSING REGISTER | ○ | ○ | ○ |
| 251 | CANCELLATION REPORT OF WAREHOUSING RESULT OF PARTS | ○ | PARTS WAREHOUSING CANCELLATION SLIP | PARTS WAREHOUSING REGISTER | ○ | ○ | ○ |
| 252 | REPORT OF INVENTORY OF PARTS | ○ | PARTS INVENTORY SLIP | PARTS INVENTORY REGISTER | ○ | ○ | ○ |
| 253 | CORRECTION REPORT OF INVENTORY OF PARTS | ○ | PARTS INVENTORY CORRECTION SLIP | PARTS INVENTORY REGISTER | ○ | ○ | ○ |
| 254 | CANCELLATION REPORT OF INVENTORY OF PARTS | ○ | PARTS INVENTORY CANCELLATION SLIP | PARTS INVENTORY REGISTER | ○ | ○ | ○ |
| 255 | REPORT OF STOCK WASTE OF PARTS | ○ | PARTS STOCK WASTE SLIP | PARTS STOCK WASTE REGISTER | ○ | ○ | ○ |
| 256 | CORRECTION REPORT OF STOCK WASTE OF PARTS | ○ | PARTS STOCK WASTE CORRECTION SLIP | PARTS STOCK WASTE REGISTER | ○ | ○ | ○ |
| 257 | CANCELLATION REPORT OF STOCK WASTE OF PARTS | ○ | PARTS STOCK WASTE CANCELLATION SLIP | PARTS STOCK WASTE REGISTER | ○ | ○ | ○ |
| 258 | REPORT OF DISPATCH SCHEDULE OF PARTS | ○ | PARTS DISPATCH SCHEDULE SLIP | PARTS DISPATCH SCHEDULE TABLE | | | |
| 259 | CORRECTION REPORT OF DISPATCH SCHEDULE OF PARTS | ○ | PARTS DISPATCH SCHEDULE CORRECTION SLIP | PARTS DISPATCH SCHEDULE TABLE | | | |
| 260 | CANCELLATION REPORT OF DISPATCH SCHEDULE OF PARTS | ○ | PARTS DISPATCH SCHEDULE CANCELLATION SLIP | PARTS DISPATCH SCHEDULE TABLE | | | |

FIG. 61

| # | Report | | Slip | Register | | | | | | | |
|---|---|---|---|---|---|---|---|---|---|---|---|
| 261 | REPORT OF DISPATCH RESULT OF PARTS | O | PARTS DISPATCH SLIP | PARTS DISPATCH REGISTER | O | O | O | O | | | |
| 262 | CORRECTION REPORT OF DISPATCH RESULT OF PARTS | O | PARTS DISPATCH CORRECTION SLIP | PARTS DISPATCH REGISTER | O | O | O | O | | | |
| 263 | CANCELLATION REPORT OF DISPATCH RESULT OF PARTS | O | PARTS DISPATCH CANCELLATION SLIP | PARTS DISPATCH REGISTER | O | O | O | O | | | |
| 264 | REPORT OF PROCESS WAREHOUSING SCHEDULE OF MATERIAL | O | MATERIAL PROCESS WAREHOUSING SCHEDULE SLIP | MATERIAL PROCESS WAREHOUSING SCHEDULE TABLE | | | | | | | |
| 265 | CORRECTION REPORT OF PROCESS WAREHOUSING SCHEDULE OF MATERIAL | O | MATERIAL PROCESS WAREHOUSING SCHEDULE CORRECTION SLIP | MATERIAL PROCESS WAREHOUSING SCHEDULE TABLE | | | | | | | |
| 266 | CANCELLATION REPORT OF PROCESS WAREHOUSING SCHEDULE OF MATERIAL | O | MATERIAL PROCESS WAREHOUSING SCHEDULE CANCELLATION SLIP | MATERIAL PROCESS WAREHOUSING SCHEDULE TABLE | | | | | | | |
| 267 | REPORT OF PROCESS WAREHOUSING RESULT OF MATERIAL | O | MATERIAL PROCESS WAREHOUSING SLIP | MATERIAL PROCESS WAREHOUSING REGISTER | O | O | O | O | O | O | O |
| 268 | CORRECTION REPORT OF PROCESS WAREHOUSING RESULT OF MATERIAL | O | MATERIAL PROCESS WAREHOUSING CORRECTION SLIP | MATERIAL PROCESS WAREHOUSING REGISTER | O | O | O | O | O | O | O |
| 269 | CANCELLATION REPORT OF PROCESS WAREHOUSING RESULT OF MATERIAL | O | MATERIAL PROCESS WAREHOUSING CANCELLATION SLIP | MATERIAL PROCESS WAREHOUSING REGISTER | O | O | O | O | O | O | O |
| 270 | REPORT OF PROCESS INVENTORY OF MATERIAL | O | MATERIAL PROCESS INVENTORY SLIP | MATERIAL PROCESS INVENTORY REGISTER | O | O | O | O | O | O | O |
| 271 | CORRECTION REPORT OF PROCESS INVENTORY OF MATERIAL | O | MATERIAL PROCESS INVENTORY CORRECTION SLIP | MATERIAL PROCESS INVENTORY REGISTER | O | O | O | O | O | O | O |
| 272 | CANCELLATION REPORT OF PROCESS INVENTORY OF MATERIAL | O | MATERIAL PROCESS INVENTORY CANCELLATION SLIP | MATERIAL PROCESS INVENTORY REGISTER | O | O | O | O | O | O | O |
| 273 | REPORT OF PROCESS STOCK WASTE OF MATERIAL | O | MATERIAL PROCESS STOCK WASTE SLIP | MATERIAL PROCESS STOCK WASTE REGISTER | O | O | O | O | O | O | O |

| # | Description 1 | | | | | Col | Description 2 | Description 3 | C1 | C2 | C3 | C4 | C5 | C6 | C7 | C8 | C9 | C10 |
|---|---|---|---|---|---|---|---|---|---|---|---|---|---|---|---|---|---|---|
| 274 | CORRECTION REPORT OF PROCESS STOCK WASTE OF MATERIAL | | | | | ○ | MATERIAL PROCESS STOCK WASTE CORRECTION SLIP | MATERIAL PROCESS STOCK WASTE REGISTER | | | | | ○ | ○ | ○ | ○ | ○ | ○ |
| 275 | CANCELLATION REPORT OF PROCESS STOCK WASTE OF MATERIAL | | | | | ○ | MATERIAL PROCESS STOCK WASTE CANCELLATION SLIP | MATERIAL PROCESS STOCK WASTE REGISTER | | | | | ○ | ○ | ○ | ○ | ○ | ○ |
| 276 | REPORT OF PROCESS WAREHOUSING SCHEDULE OF MATERIAL | | | | | ○ | MATERIAL PROCESS WAREHOUSING SCHEDULE SLIP | MATERIAL PROCESS WAREHOUSING SCHEDULE TABLE | | | | | | | | | | |
| 277 | CORRECTION REPORT OF PROCESS WAREHOUSING SCHEDULE OF MATERIAL | | | | | ○ | MATERIAL PROCESS WAREHOUSING SCHEDULE CORRECTION SLIP | MATERIAL PROCESS WAREHOUSING SCHEDULE TABLE | | | | | | | | | | |
| 278 | CANCELLATION REPORT OF PROCESS WAREHOUSING SCHEDULE OF MATERIAL | | | | | ○ | MATERIAL PROCESS WAREHOUSING SCHEDULE CANCELLATION SLIP | MATERIAL PROCESS WAREHOUSING SCHEDULE TABLE | | | | | | | | | | |
| 279 | REPORT OF PROCESS WAREHOUSING RESULT OF MATERIAL | | | | | ○ | MATERIAL PROCESS WAREHOUSING SLIP | MATERIAL PROCESS WAREHOUSING REGISTER | | | | | ○ | ○ | ○ | ○ | ○ | ○ |
| 280 | CORRECTION REPORT OF PROCESS WAREHOUSING RESULT OF MATERIAL | | | | | ○ | MATERIAL PROCESS WAREHOUSING CORRECTION SLIP | MATERIAL PROCESS WAREHOUSING REGISTER | | | | | ○ | ○ | ○ | ○ | ○ | ○ |
| 281 | CANCELLATION REPORT OF PROCESS WAREHOUSING RESULT OF MATERIAL | | | | | ○ | MATERIAL PROCESS WAREHOUSING CANCELLATION SLIP | MATERIAL PROCESS WAREHOUSING REGISTER | | | | | ○ | ○ | ○ | ○ | ○ | ○ |
| 282 | REPORT OF PROCESS INVENTORY OF MATERIAL | | | | | ○ | MATERIAL PROCESS INVENTORY SLIP | MATERIAL PROCESS INVENTORY REGISTER | | | | | ○ | ○ | ○ | ○ | ○ | ○ |
| 283 | CORRECTION REPORT OF PROCESS INVENTORY OF MATERIAL | | | | | ○ | MATERIAL PROCESS INVENTORY CORRECTION SLIP | MATERIAL PROCESS INVENTORY REGISTER | | | | | ○ | ○ | ○ | ○ | ○ | ○ |
| 284 | CANCELLATION REPORT OF PROCESS INVENTORY OF MATERIAL | | | | | ○ | MATERIAL PROCESS INVENTORY CANCELLATION SLIP | MATERIAL PROCESS INVENTORY REGISTER | | | | | ○ | ○ | ○ | ○ | ○ | ○ |
| 285 | REPORT OF PROCESS STOCK WASTE OF MATERIAL | | | | | ○ | MATERIAL PROCESS STOCK WASTE SLIP | MATERIAL PROCESS STOCK WASTE REGISTER | | | | | ○ | ○ | ○ | ○ | ○ | ○ |
| 286 | CORRECTION REPORT OF PROCESS STOCK WASTE OF MATERIAL | | | | | ○ | MATERIAL PROCESS STOCK WASTE CORRECTION SLIP | MATERIAL PROCESS STOCK WASTE REGISTER | | | | | ○ | ○ | ○ | ○ | ○ | ○ |

| No. | Report | | Slip | | Register/Table |
|---|---|---|---|---|---|
| 287 | CANCELLATION REPORT OF PROCESS STOCK MASTER OF MATERIAL | ○ | MATERIAL PROCESS STOCK WASTE CANCELLATION SLIP | ○ | MATERIAL PROCESS STOCK WASTE REGISTER |
| 288 | REPORT OF PROCESS WAREHOUSING SCHEDULE OF PARTS | ○ | PARTS PROCESS WAREHOUSING SCHEDULE SLIP | | PARTS PROCESS WAREHOUSING SCHEDULE TABLE |
| 289 | CORRECTION REPORT OF PROCESS WAREHOUSING SCHEDULE OF PARTS | ○ | PARTS PROCESS WAREHOUSING SCHEDULE CORRECTION SLIP | | PARTS PROCESS WAREHOUSING SCHEDULE TABLE |
| 290 | CANCELLATION REPORT OF PROCESS WAREHOUSING SCHEDULE OF PARTS | ○ | PARTS PROCESS WAREHOUSING SCHEDULE CANCELLATION SLIP | | PARTS PROCESS WAREHOUSING SCHEDULE TABLE |
| 291 | REPORT OF PROCESS WAREHOUSING RESULT OF PARTS | ○ | PARTS PROCESS WAREHOUSING SLIP | ○ | PARTS PROCESS WAREHOUSING REGISTER |
| 292 | CORRECTION REPORT OF PROCESS WAREHOUSING RESULT OF PARTS | ○ | PARTS PROCESS WAREHOUSING CORRECTION SLIP | ○ | PARTS PROCESS WAREHOUSING REGISTER |
| 293 | CANCELLATION REPORT OF PROCESS WAREHOUSING RESULT OF PARTS | ○ | PARTS PROCESS WAREHOUSING CANCELLATION SLIP | ○ | PARTS PROCESS WAREHOUSING REGISTER |
| 294 | REPORT OF PROCESS INVENTORY OF PARTS | ○ | PARTS PROCESS INVENTORY SLIP | ○ | PARTS PROCESS INVENTORY REGISTER |
| 295 | CORRECTION REPORT OF PROCESS INVENTORY OF PARTS | ○ | PARTS PROCESS INVENTORY CORRECTION SLIP | ○ | PARTS PROCESS INVENTORY REGISTER |
| 296 | CANCELLATION REPORT OF PROCESS INVENTORY OF PARTS | ○ | PARTS PROCESS INVENTORY CANCELLATION SLIP | ○ | PARTS PROCESS INVENTORY REGISTER |
| 297 | REPORT OF PROCESS STOCK WASTE OF PARTS | ○ | PARTS PROCESS STOCK WASTE SLIP | ○ | PARTS PROCESS STOCK WASTE REGISTER |
| 298 | CORRECTION REPORT OF PROCESS STOCK WASTE OF PARTS | ○ | PARTS PROCESS STOCK WASTE CORRECTION SLIP | ○ | PARTS PROCESS STOCK WASTE REGISTER |

| # | Report/Slip Name | Parts Process Stock Waste Cancellation Slip | Product Process Dispatch Schedule Slip | Product Process Dispatch Schedule Correction Slip | Product Process Dispatch Schedule Cancellation Slip | Product Process Dispatch Slip | Product Process Dispatch Correction Slip | Product Process Dispatch Cancellation Slip | Product Production Slip | Product Production Correction Slip | Product Production Cancellation Slip | Product Warehousing Schedule Slip | Product Warehousing Schedule Correction Slip | Product Warehousing Schedule Cancellation Slip | Product Warehousing Slip | Parts Process Stock Waste Register | Product Process Dispatch Schedule Table | Product Process Dispatch Register | Production Result Register | Product Warehousing Schedule Table | Product Warehousing Register |
|---|---|---|---|---|---|---|---|---|---|---|---|---|---|---|---|---|---|---|---|---|---|
| 299 | CANCELLATION REPORT OF PROCESS STOCK WASTE OF PARTS | ○ | | | | | | | | | | | | | | ○ | | | | | |
| 300 | REPORT OF PROCESS DISPATCH SCHEDULE OF PRODUCT | | ○ | | | | | | | | | | | | | | ○ | | | | |
| 301 | CORRECTION REPORT OF PROCESS DISPATCH SCHEDULE OF PRODUCT | | | ○ | | | | | | | | | | | | | ○ | | | | |
| 302 | CANCELLATION REPORT OF PROCESS DISPATCH SCHEDULE OF PRODUCT | | | | ○ | | | | | | | | | | | | ○ | | | | |
| 303 | REPORT OF PROCESS DISPATCH RESULT OF PRODUCT | | | | | ○ | | | | | | | | | | | | ○ | | | |
| 304 | CORRECTION REPORT OF PROCESS DISPATCH RESULT OF PRODUCT | | | | | | ○ | | | | | | | | | | | ○ | | | |
| 305 | CANCELLATION REPORT OF PROCESS DISPATCH RESULT OF PRODUCT | | | | | | | ○ | | | | | | | | | | ○ | | | |
| 306 | REPORT OF PRODUCTION RESULT | | | | | | | | ○ | | | | | | | | | | ○ | | |
| 307 | CORRECTION REPORT OF PRODUCTION RESULT | | | | | | | | | ○ | | | | | | | | | ○ | | |
| 308 | CANCELLATION REPORT OF PRODUCTION RESULT | | | | | | | | | | ○ | | | | | | | | ○ | | |
| 309 | REPORT OF WAREHOUSING SCHEDULE OF PRODUCT | | | | | | | | | | | ○ | | | | | | | | ○ | |
| 310 | CORRECTION REPORT OF WAREHOUSING SCHEDULE OF PRODUCT | | | | | | | | | | | | ○ | | | | | | | ○ | |
| 311 | CANCELLATION REPORT OF WAREHOUSING SCHEDULE OF PRODUCT | | | | | | | | | | | | | ○ | | | | | | ○ | |
| 312 | REPORT OF WAREHOUSING RESULT OF PRODUCT | | | | | | | | | | | | | | ○ | | | | | | ○ |

FIG. 6Y

| # | Report | | Slip | Register | | | | |
|---|---|---|---|---|---|---|---|---|
| 313 | CORRECTION REPORT OF WAREHOUSING RESULT OF PRODUCT | ○ | PRODUCT WAREHOUSING CORRECTION SLIP | PRODUCT WAREHOUSING REGISTER | ○ | ○ | ○ | ○ |
| 314 | CANCELLATION REPORT OF WAREHOUSING RESULT OF PRODUCT | ○ | PRODUCT WAREHOUSING CANCELLATION SLIP | PRODUCT WAREHOUSING REGISTER | ○ | ○ | ○ | ○ |
| 315 | REPORT OF INVENTORY OF PRODUCT | ○ | PRODUCT INVENTORY SLIP | PRODUCT INVENTORY REGISTER | ○ | ○ | ○ | ○ |
| 316 | CORRECTION REPORT OF INVENTORY OF PRODUCT | ○ | PRODUCT INVENTORY CORRECTION SLIP | PRODUCT INVENTORY REGISTER | ○ | ○ | ○ | ○ |
| 317 | CANCELLATION REPORT OF INVENTORY OF PRODUCT | ○ | PRODUCT INVENTORY CANCELLATION SLIP | PRODUCT INVENTORY REGISTER | ○ | ○ | ○ | ○ |
| 318 | REPORT OF STOCK WASTE OF PRODUCT | ○ | PRODUCT STOCK WASTE SLIP | PRODUCT STOCK WASTE REGISTER | ○ | ○ | ○ | |
| 319 | CORRECTION REPORT OF STOCK WASTE OF PRODUCT | ○ | PRODUCT STOCK WASTE CORRECTION SLIP | PRODUCT STOCK WASTE REGISTER | ○ | ○ | ○ | |
| 320 | CANCELLATION REPORT OF STOCK WASTE OF PRODUCT | ○ | PRODUCT STOCK WASTE CANCELLATION SLIP | PRODUCT STOCK WASTE REGISTER | ○ | ○ | ○ | |
| 321 | REPORT OF DISPATCH SCHEDULE OF PRODUCT | ○ | PRODUCT DISPATCH SCHEDULE SLIP | PRODUCT DISPATCH SCHEDULE TABLE | | | | |
| 322 | CORRECTION REPORT OF DISPATCH SCHEDULE OF PRODUCT | ○ | PRODUCT DISPATCH SCHEDULE CORRECTION SLIP | PRODUCT DISPATCH SCHEDULE TABLE | | | | |
| 323 | CANCELLATION REPORT OF DISPATCH SCHEDULE OF PRODUCT | ○ | PRODUCT DISPATCH SCHEDULE CANCELLATION SLIP | PRODUCT DISPATCH SCHEDULE TABLE | | | | |
| 324 | REPORT OF DISPATCH RESULT OF PRODUCT | ○ | PRODUCT DISPATCH SLIP | PRODUCT DISPATCH REGISTER | ○ | ○ | ○ | ○ |
| 325 | CORRECTION REPORT OF DISPATCH RESULT OF PRODUCT | ○ | PRODUCT DISPATCH CORRECTION SLIP | PRODUCT DISPATCH REGISTER | ○ | ○ | ○ | ○ |
| 326 | CANCELLATION REPORT OF DISPATCH RESULT OF PRODUCT | ○ | PRODUCT DISPATCH CANCELLATION SLIP | PRODUCT DISPATCH REGISTER | ○ | ○ | ○ | ○ |

| | | RAW MATERIAL INVENTORY SLIP | MATERIAL INVENTORY SLIP | PARTS INVENTORY SLIP | PROCESS RAW MATERIAL INVENTORY SLIP | PROCESS MATERIAL INVENTORY | PROCESS PARTS INVENTORY | PRODUCT INVENTORY SLIP | GENERAL LEDGER |
|---|---|---|---|---|---|---|---|---|---|
| 327 | RAW MATERIAL INVENTORY | ○ | | | | | | | ○ |
| 328 | MATERIAL INVENTORY | | ○ | | | | | | ○ |
| 329 | PARTS INVENTORY | | | ○ | | | | | ○ |
| 330 | PROCESS RAW MATERIAL INVENTORY | | | | ○ | | | | ○ |
| 331 | PROCESS MATERIAL INVENTORY | | | | | ○ | | | ○ |
| 332 | PROCESS PARTS INVENTORY | | | | | | ○ | | ○ |
| 333 | PRODUCT INVENTORY | | | | | | | ○ | ○ |

FIG. 6Z

COMPUTER BUSINESS OPERATION PROCESSING RULE STANDARD (ORDER RECEPTION)

| No. | BUSINESS OPERATION PROCESSING RULE | BUSINESS OPERATION PROCESS RULE LOGIC |
|---|---|---|
| 1 | CONFIRMATION OF CLIENT | CHECK OF OPENING OF TRANSACTION ACCOUNT OF CLIENT |
| 2 | PROPRIETY OF BUSINESS DAY OF CLIENT | CHECK OF TRANSACTABLE DAY OF CLIENT |
| 3 | CONFIRMATION OF ORGANIZATION OF CLIENT | CHECK OF COLLECTION SCHEDULE DATE OF MERCHANDISE SALES AMOUNT OF CLIENT |
| 4 | CONFIRMATION OF COLLECTION SCHEDULE DATE OF CLIENT | CHECK OF COLLECTION SCHEDULE DATE OF MERCHANDISE SALES AMOUNT FROM CLIENT |
| 5 | CONFIRMATION OF MERCHANDISE FOR CLIENT | CONFIRMATION OF CLIENT AND MERCHANDISE FOR CLIENT |
| 6 | CONFIRMATION OF MERCHANDISE ORDER RECEPTION ALLOTMENT OF CLIENT | CONFIRMATION OF CLIENT AND MERCHANDISE SALES ALLOTMENT QUANTITY FOR CLIENT |
| 7 | CONFIRMATION AND PROPRIETY OF MERCHANDISE QUANTITY DISCOUNT PRICE FOR CLIENT | CHECK OF CLIENT AND MERCHANDISE QUANTITY DISCOUNT PRICE FOR CLIENT |
| 8 | CONFIRMATION OF BILLING PERIOD OF CLIENT | BILLING DEADLINE OF SALES TRANSACTION WITH CLIENT |
| 9 | BILLING DEADLINE OF CLIENT | BILLING DEADLINE OF SALES TRANSACTION WITH CLIENT |
| 10 | CONFIRMATION OF CREDIT AMOUNT OF CLIENT AND PROPRIETY OF SALES AMOUNT | AMOUNT OF SALES LIMIT FOR EACH CLIENT |
| 11 | CONFIRMATION OF DELIVERY DESTINATION OF CLIENT | CONFIRMATION OF DELIVERY DESTINATION OF CLIENT |
| 12 | CONFIRMATION OF SALES MERCHANDISE | SALES MERCHANDISE AND SALES PERIOD |
| 13 | CONFIRMATION AND PROPRIETY OF PRICE OF SALES MERCHANDISE | PRICE OF SALES MERCHANDISE AND ITS APPLICATION PERIOD |
| 14 | CONFIRMATION AND PROPRIETY OF QUANTITY PRICE OF SALES MERCHANDISE | SALES PRICE OF SALES MERCHANDISE FOR EACH SALES QUANTITY |
| 15 | CONFIRMATION OF GOOD BUY RELATED TO SALES MERCHANDISE | GOOD BUY RELATED TO SALES MERCHANDISE |
| 16 | CONFIRMATION OF SUBSTITUTE OF SALES MERCHANDISE | MERCHANDISE SUBSTITUTABLE FOR SALES MERCHANDISE |
| 17 | CONFIRMATION OF MERCHANDISE SIMILAR TO SALES MERCHANDISE | MERCHANDISE SIMILAR TO SALES MERCHANDISE |
| 18 | STRATEGIC STOCK OF SALES MERCHANDISE | DISCLOSED STOCK AS STRATEGIC STOCK OF SALES MERCHANDISE |
| 19 | CONFIRMATION OF SALES LOT OF SALES MERCHANDISE AND PROPRIETY OF SALES QUANTITY | MINIMUM UNIT OF SALES QUANTITY OF SALES MERCHANDISE |

| | | |
|---|---|---|
| 20 | CONFIRMATION OF DELIVERY LOT OF SALES MERCHANDISE AND PROPRIETY OF DERIVERY QUANTITY | MINIMUM UNIT OF DELIVERY QUANTITY OF SALES MERCHANDISE |
| 21 | CONFIRMATION OF REQUIRED DERIVERY TIME OF SALES MERCHANDISE AND PROPRIETY OF DERIVERY DATE | TIME AND DAYS REQUIRED FROM ORDER RECEPTION OF SALES MERCHANDISE TO DELIVERY |
| 22 | CONFIRMATION OF ORDERING POINT OF SALES MERCHANDISE AND PROPRIETY OF REGULAR ORDER | STOCK FOR DETERMINING ORDERING TIME OF REGULAR ORDER FOR SALES MERCHANDISE |
| 23 | CONFIRMATION OF SALES PLAN OF SALES MERCHANDISE | PLAN OF SALES PERIOD, QUANTITY, AND PROFIT OF SALES MERCHANDISE |
| 24 | CONFIRMATION OF STOCK LIMIT OF SALES MERCHANDISE AND PROPRIETY OF STOCK | UPPER LIMIT QUANTITY OF STOCK OF SALES MERCHANDISE |
| 25 | CONFIRMATION OF APPROPRIATE STOCK OF SALES MERCHANDISE AND PROPRIETY OF STOCK | APPROPRIATE QUANTITY OF STOCK OF SALES MERCHANDISE |
| 26 | CONFIRMATION OF BANKING ORGANIZATION ACCOUNT FOR SALES AMOUNT COLLECTION | SETTING OF BANKING ORGANIZATION ACCOUNT FOR SALES AMOUNT COLLECTION |
| 27 | CONFIRMATION OF SALES AUTHORITY OF PERSON IN CHARGE AND PROPRIETY OF SALES AMOUNT | UPPER LIMIT AMOUNT OF SALES AUTHORITY OF PERSON IN CHARGE |
| 28 | CONFIRMATION OF CLIENT OF PERSON IN CHARGE | CONFIRMATION OF CLIENT OF PERSON IN CHARGE |
| 29 | CONFIRMATION OF MERCHANDISE OF PERSON IN CHARGE | CONFIRMATION OF MERCHANDISE OF PERSON IN CHARGE |
| 30 | CONFIRMATION OF CLIENT OF ORGANIZATION | CHECK OF TRANSACTION ACCOUNT OPENING OF CLIENT OF ORGANIZATION IN CHARGE |
| 31 | CONFIRMATION OF CLIENT ORGANIZATION OF ORGANIZATION | CHECK OF TRANSACTION ACCOUNT OPENING OF CLIENT ORGANIZATION OF GANIZATION IN CHARGE |

COMPUTER BUSINESS OPERATION PROCESSING RULE STANDARD (ORDER RECEPTION)

| No. | BUSINESS OPERATION PROCESSING RULE APPLICATION ITEM | ITEM CHECK ||||| ARITHMETIC OPERATION /EDITING | ARITHMETIC OPERATION /EDITING APPLICATION ITEM |
|---|---|---|---|---|---|---|---|---|
| | | UPPER LIMIT CHECK APPLICATION ITEM | LOWER LIMIT CHECK APPLICATION ITEM | UNIT CHECK APPLICATION ITEM | PRESENCE CHECK APPLICATION ITEM | TOTAL AMOUNT /COMPARISON CHECK APPLICATION ITEM | | |
| 1 | CLIENT | — | — | — | CLIENT | — | — | — |
| 2 | DATE OF SHIPMENT, DATE OF DELIVERY, ETC. | — | — | — | CLIENT | — | — | — |
| 3 | CLIENT ORGANIZATION | — | — | — | CLIENT, CLIENT ORGANIZATION | — | — | — |
| 4 | COLLECTION SCHEDULE DATE | — | — | — | CLIENT | — | — | — |
| 5 | SALES MERCHANDISE | — | — | — | CLIENT | — | — | — |
| 6 | SALES QUANTITY | — | SALES QUANTITY | — | CLIENT, MERCHANDISE, SALES QUANTITY | — | — | — |
| 7 | SALES AMOUNT | — | — | — | CLIENT | — | — | — |
| 8 | TURNOVER | TURNOVER DATE | TURNOVER DATE | — | CLIENT | — | — | — |
| 9 | BILLING DATE | BILLING DATE | — | — | CLIENT | — | — | — |
| 10 | ORDER RECEPTION AMOUNT | CREDIT AMOUNT | — | — | CLIENT | TOTAL AMOUNT OF ORDER RECEIVED WITHIN PERIOD | — | — |
| 11 | DELIVERY DESTINATION | — | — | — | CLIENT, DELIVERY DESTINATION | — | — | — |

FIG. 7B-1

| | | | | | | |
|---|---|---|---|---|---|---|
| 12 | SALES MERCHANDISE | — | — | — | MERCHANDISE | — |
| 13 | UNIT PRICE OF SALES MERCHANDISE | — | — | — | MERCHANDISE | — |
| 14 | UNIT PRICE OF SALES MERCHANDISE | — | — | — | MERCHANDISE | — |
| 15 | SALES MERCHANDISE | — | — | — | MERCHANDISE | — |
| 16 | SALES MERCHANDISE | — | — | — | MERCHANDISE | — |
| 17 | SALES MERCHANDISE | — | — | — | MERCHANDISE | — |
| 18 | STOCK OF SALES MERCHANDISE | — | — | — | MERCHANDISE | — |
| 19 | SALES UNIT QUANTITY OF SALES MERCHANDISE | — | — | SALES LOT | MERCHANDISE | — |
| 20 | DELIVERY UNIT QUANTITY OF SALES MERCHANDISE | — | — | DELIVERY LOT | MERCHANDISE | — |
| 21 | DELIVERY SCHEDULE DATE | — | DAYS REQUIRED FROM ORDER RECEIVED TO DELIVERY DATE | — | MERCHANDISE | — |
| 22 | DATE OF REGULAR ORDER | — | — | — | MERCHANDISE, PLAN PERIOD | — |
| 23 | SALES RESULT | STOCK | — | — | MERCHANDISE | — |
| 24 | STOCK OF SALES MERCHANDISE | — | — | — | MERCHANDISE | STOCK OF SALES MERCHANDISE |
| 25 | STOCK OF SALES MERCHANDISE | — | — | — | MERCHANDISE | — |

FIG. 7B-2

|  |  |  |  |  |  |  |
|---|---|---|---|---|---|---|
| 26 | BANKING ORGANIZATION, BRANCH, ACCOUNT | — | — | — | BANKING ORGANIZATION, BRANCH, ACCOUNT | STOCK OF SALES MERCHANDISE | — |
| 27 | SALES AMOUNT | SALES AMOUNT OF PERSON IN CHARGE | — | — | PERSON IN CHARGE | — | — |
| 28 | SALES DESTINATION | — | — | — | PERSON IN CHARGE, CLIENT | — | — |
| 29 | SALES MECHANDISE | — | — | — | PERSON IN CHARGE, MERCHANDISE | — | — |
| 30 | CLIENT | — | — | — | ORGANIZATION, CLIENT | — | — |
| 31 | ORGANIZATION, CLIENT | — | — | — | ORGANIZATION, CLIENT, ORGANIZATION | — | — |

COMPUTER BUSINESS OPERATION PROCESSING RULE STANDARD (ORDERING)

| No. | BUSINESS OPERATION PROCESSING RULE | BUSINESS OPERATION PROCESSING RULE LOGIC |
|---|---|---|
| 1 | CONFIRMATION OF PURCHASE MERCHANDISE | CHECK OF PURCHASABLE STATE OF PURCHASE MERCHANDISE |
| 2 | CONFIRMATION OF REFERENCE PRICE OF PURCHASE MERCHANDISE AND PROPRIETY OF PURCHASE PRICE | CHECK OF PURCHASE REFERENCE PRICE OF PURCHASE MERCHANDISE |
| 3 | CONFIRMATION OF PURCHASE PLAN OF PURCHASE MERCHANDISE | CONFIRMATION OF PURCHASE PERIOD, QUANTITY, AMOUNT PLAN OF PURCHASE MERCHANDSIE |
| 4 | CONFIRMATION OF UPPER LIMIT PURCHARSE PRICE OF PURCHASE MERCHANDISE | CHECK OF UPPER LIMIT PURCHASE PRICE OF PURCHASE MERCHANDISE |
| 5 | CONFIRMATION OF PURCHASE STOCK LIMIT OF PURCHASE MERCHANDISE AND PROPRIETY OF STOCK | UPPER LIMIT STOCK QUANTITY OF PURCHASE MERCHANDSIE |
| 6 | CONFIRMATION OF APPROPRIATE STOCK OF PURCHASE MERCHANDISE AND PROPRIETY OF STOCK | CHECK OF APPROPRIATE STOCK OF PURCHASE MERCHANDSIE |
| 7 | CONFIRMATION OF REQOIRED SUPPLY TIME OF PURCHASE MERCHANDISE AND PROPRIETY OF DEVILTRY PERIOD | TIME AND DAYS REQUIRED FROM ORDER OF PURCHASE MERCHANDSIE TO ITS RECEPTION |
| 8 | CONFIRMATION OF RECEPTION LOT OF PURCHASE MERCHANDSIE AND PROPRIETY OF THE NUMBER OF DELIVERIES | CHECK OF MINIMUM UNIT OF RECEPTION QUANTITY OF PURCHASE MERCHANDSIE |
| 9 | CONFIRMATION OF SUPPLY LOT OF PURCHASE MERCHANDISE AND PROPRIETY OF THE NUMBER OF PURCHASES | CHECK OF MINIMUM UNIT OF PURCHASE QUANTITY OF PURCHASE MERCHANDISE |
| 10 | CONFIRMATION OF REQUIRED SUPPLY TIME OF PURCHASE MERCHANDISE AND PROPRIETY OF DELIVERY DATE | TIME AND DAYS REQUIRED FROM ORDER OF PURCHASE MERCHANDISE TO RECEPTION |
| 11 | CONFIRMATION OF ORDERING POINT PURCHASE MERCHANDISE AND PROPRIETY OF REGULAR ORDER | CHECK OF STOCK FOR DETERMINING ORDERING POINT OF REGULAR ORDER OF PURCHASE MERCHANDISE |
| 12 | CONFIRMATION OF PRE-ARRANGEMENT LIMIT AMOUNT AND PROPRIETY OF PRE-ARRANGEMENT AMOUNT | LIMIT AMOUNT (SAFE AMOUNT) OF PRE-ARRANGEMENT OF TO-BE-SOLD MERCHANDISE AND THE LIKE |
| 13 | CONFIRMATION OF SUPPLIER | CHECK OF PURCHASE TRANSACTION ACCOUNT OPENING OF SUPPLIER |
| 14 | PROPRIETY OF BUSINESS DAY OF SUPPLIER | CHECK OF BUSINESS DAY (DAY ALLOWING TRANSACTION) OF SUPPLIER |

| | | |
|---|---|---|
| 15 | CONFIRMATION OF PURCHASE LIMIT AMOUNT OF SUPPLIER AND PROPRIETY OF PURCHASE AMOUNT | CHECK OF UPPER LIMIT PURCHASE AMOUNT OF SUPPLIER |
| 16 | CONFIRMATION OF PAYMENT SCHEDULE DATE OF SUPPLIER | CHECK OF PAYMENT SCHEDULE DATE OF MERCHANDISE PURCHASE AMOUNT TO SUPPLIER |
| 17 | CONFIRMATION OF MERCHANDISE OF SUPPLIER | CHECK OF SUPPLIER AND ITS MERCHANDISE |
| 18 | CONFIRMATION OF MERCHANDISE ORDER ALLOTMENT AMOUNT OF SUPPLIER | CONFIRMATION OF SUPPLIER AND ITS ALLOTMENT AMOUNT OF MERCHANDISE |
| 19 | CONFIRMATION OF MERCHANDISE ORDER ALLOTMENT PROPORTION OF SUPPLIER | CONFIRMATION OF MERCHANDISE ALLOTMENT QUANTITY OF SUPPLIER |
| 20 | CONFIRMATION OF BILLING PERIOD OF SUPPLIER | BILLING UNIT PERIOD OF PURCHASE TRANSACTION WITH SUPPLIER |
| 21 | CONFIRMATION OF BILLING DEADLINE OF SUPPLIER | CHECK OF BILLING DEADLINE OF PURCHASE TRANSACTION WITH SUPPLIER |
| 22 | CONFIRMATION OF SUPPLIER ORGANIZATION | SUPPLIER ORGANIZATION |
| 23 | CONFIRMATION OF BANKING ORGANIZATION ACCOUNT OF PAYMENT TO SUPPLIER | CHECK OF BANKING ORGANIZATION ACCOUNT OF PAYMENT TO SUPPLIER |
| 24 | CONFIRMATION OF PURCHASE AUTHORITY OF PERSON IN CHARGE AND PROPRIETY OF PURCHASE AMOUNT | CHECK OF UPPER LIMIT AMOUNT OF PURCHASE AUTHORITY OF PERSON IN CHARGE |
| 25 | CONFIRMATION OF SUPPLIER OF PERSON IN CHARGE | CHECK OF SUPPLIER OF PERSON IN CHARGE |
| 26 | CONFIRMATION OF PURCHASE MERCHANDISE OF PERSON IN CHARGE | CHECK OF PERCHES MERCHANDISE OF PERSON IN CHARGE |
| 27 | CONFIRMATION OF SUPPLIER OF ORGANIZATION | CHECK OF SUPPLIER WITH WHICH ORGANIZATION IS IN CHARGE |
| 28 | CONFIRMATION OF SUPPLIER ORGANIZATION OF ORGANIZATION | CHECK OF SUPPLIER ORGANIZATION WITH WHICH ORGANIZATION IS IN CHARGE |

FIG. 8A-2

COMPUTER BUSINESS OPERATION PROCESSING RULE STANDARD (ORDERING)

| No. | BUSINESS OPERATION PROCESSING RULE APPLICATION ITEM | ITEM CHECK |||||| ARITHMETIC OPERATION /EDITING | ARITHMETIC OPERATION /EDITING APPLICATION ITEM |
|---|---|---|---|---|---|---|---|---|
| | | UPPER LIMIT CHECK APPLICATION ITEM | LOWER LIMIT CHECK APPLICATION ITEM | UNIT CHECK APPLICATION ITEM | PRESENCE CHECK APPLICATION ITEM | TOTAL AMOUNT /COMPARISON CHECK APPLICATION ITEM | | |
| 1 | PURCHASE MERCHANDISE | — | — | — | SUPPLIER, SUPPLIER ORGANIZATION | — | — | |
| 2 | UNIT PRICE OF PURCHASE MERCHANDISE | — | — | — | MERCHANDISE | — | — | |
| 3 | PURCHASE RESULT | — | — | — | MERCHANDISE, PURCHASE PERIOD | — | — | |
| 4 | UNIT PRICE OF PURCHASE MERCHANDISE | — | — | — | MERCHANDISE | — | — | |
| 5 | THE NUMBER OF ORDERS OF PURCHASE MERCHANDISE | STOCK LIMIT | — | — | MERCHANDISE | STOCK OF PURCHASE MERCHANDISE | — | |
| 6 | THE NUMBER OF ORDERS OF PURCHASE MERCHANDISE | APPROPRIATE STOCK | APPROPRIATE STOCK | — | MERCHANDISE | STOCK OF PURCHASE MERCHANDISE | — | |
| 7 | MERCHANDISE RECEPTION DATE | — | REQUIRED SUPPLY TIME | RECEPTION LOT | MERCHANDISE | — | — | |
| 8 | ORDERING QUANTITY | — | — | SUPPLY LOT | MERCHANDISE | — | — | |
| 9 | ORDERING QUANTITY | — | — | — | MERCHANDISE | — | — | |
| 10 | MERCHANDISE RECEPTION DATE | — | REQUIRED SUPPLY TIME | — | MERCHANDISE | — | — | |

FIG. 8B-1

| # | Field | | STOCK | | MERCHANDISE | | |
|---|---|---|---|---|---|---|---|
| 11 | DATE OF ORDER | — | | | — | | — |
| 12 | ORDERING QUANTITY | AMOUNT OF ORDER TO BE RECEIVED AND PRE-ARRANGEMENT | | | ORDER TO BE RECEIVED | | — |
| 13 | ORDERING DESTINATION | — | | | SUPPLIER | | — |
| 14 | DATE OF DELIVERY, DATE OF RECEPTION OF MERCHANDISE, DATE OF PAYMENT, ETC. | — | | | SUPPLIER | | — |
| 15 | AMOUNT OF ORDER | — | | | SUPPLIER | ORDERING TOTAL AMOUNT QUANTITY OF TARGET PERIOD | — |
| 16 | DATE OF PAYMENT | PURCHASE LIMIT AMOUNT | — | | SUPPLIER | — | — |
| 17 | MERCHANDISE OF SUPPLIER | — | | | SUPPLIER, MERCHANDISE | | — |
| 18 | AMOUNT OF ORDER | PURCHASE ALLOTMENT AMOUNT | | | SUPPLIER, MERCHANDISE | ORDERING TOTAL AMOUNT QUANTITY OF TARGET PERIOD | — |
| 19 | AMOUNT OF ORDER | PURCHASE ALLOTMENT AMOUNT | | | SUPPLIER, MERCHANDISE | ORDERING TOTAL AMOUNT QUANTITY OF TARGET PERIOD | — |
| 20 | BILLING AMOUNT | BILLING DATE | BILLING DATE | — | SUPPLIER | — | — |
| 21 | BILLING DATE | BILLING DATE | — | | SUPPLIER | — | — |

FIG. 8B-2

| | | | | | | | |
|---|---|---|---|---|---|---|---|
| 22 | SUPPLIER ORGANIZATION | — | — | — | SUPPLIER | — | — |
| 23 | BANKING ORGANIZATION ACCOUNT FOR PAYMENT | — | — | — | SUPPLIER, BANKING ORGANIZAITON, BRANCH ACCOUNT NUMBER | — | — |
| 24 | PURCHASE AMOUNT | PURCHASE AMOUNT OF PERSON IN CHARGE | — | — | PERSON IN CHARGE | — | — |
| 25 | PURCHASE DESTINATION | — | — | — | PERSON IN CHARGE, SUPPLIER | — | — |
| 26 | PURCHASE MERCHANDISE | — | — | — | PERSON IN CHARGE MERCHANDISE | — | — |
| 27 | SUPPLIER | — | — | — | PERSON IN CHARGE, MERCHANDISE | — | — |
| 28 | SUPPLIER ORGANIZATION | — | — | — | ORGANIZATION, SUPPLIER, SUPPLIER ORGANIZATION | — | — |

FIG. 8B-3

COMPUTER BUSINESS OPERATION PROCESSING RULE STANDARD (ORDERING AND ORDER RECEPTION)

| No. | BUSINESS OPERATION PROCESSING RULE | BUSINESS OPERATION PROCESSING RULE STANDARD | BUSINESS OPERATION PROCESSING RULE LOGIC |
|---|---|---|---|
| 1 | CONFIRMATION OF BUSINESS DAY | | CHECK OF BUSINESS DAY (DAY ALLOWING TRANSACTION) OF COMPANY |
| 2 | CONFIRMATION OF PERSON IN CHARGE | | CHECK OF AUTHORITY OF PERSON IN CHARGE |
| 3 | CONFIRMATION OF AUTHORITY WINDOW OF PERSON IN CHARGE | | CHECK OF WINDOW WHICH CAN BE USED BY AUTHORITY OF PERSON IN CHARGE |
| 4 | CONFIRMATION OF ORGANIZATION | | CHECK OF ORGANIZATION |
| 5 | PROPRIETY OF BUSINESS DAY OF ORGANIZATION | | CHECK OF BUSINESS DAY OF ORGANIZATION (OFFICE, FACTORY, WAREHOUSE, BRANCH OFFICE, SHOP, ETC.) |
| 6 | CONFIRMATION OF AUTHORITY WINDOW OF ORGANIZATION | | CHECK OF WINDOW WHICH CAN BE USED BY AUTHORITY OF ORGANIZATION |
| 7 | CONFIRMATION OF SALES TAX RATE | | PROPRIETY OF SALES TAX AND ITS APPLICATION AND EDITING OF VALUES |
| 8 | CONFIRMATION OF INTRAOFFICE CURRENCY RATE | | EDITING OF VALUES OF INTRAOFFICE REFERENCE CURRENCY RATE |

FIG. 9A

COMPUTER BUSINESS OPERATION PROCESSING RULE STANDARD (ORDERING AND ORDER RECEPTION)

| No. | BUSINESS OPERATION PROCESSING RULE APPLICATION ITEM | ITEM CHECK ||||| ARITHMETIC OPERATION /EDITING APPLICATION ITEM |
|---|---|---|---|---|---|---|---|
| | | UPPER LIMIT CHECK APPLICATION ITEM | LOWER LIMIT CHECK APPLICATION ITEM | UNIT CHECK APPLICATION ITEM | PRESENCE CHECK APPLICATION ITEM | TOTAL AMOUNT /COMPARISON CHECK APPLICATION ITEM | |
| 1 | DATE OF DELIVERY, DATE OF RECEPTION, DATE OF PAYMENT | — | — | — | BUSINESS DAY | — | — |
| 2 | PERSON IN CHARGE | — | — | — | PERSON IN CHARGE | — | — |
| 3 | AUTHORITY WINDOW OF PERSON IN CHARGE | — | — | — | PERSON IN CHARGE, WINDOW | — | — |
| 4 | ORGANIZATION | — | — | — | ORGANIZATION | — | — |
| 5 | DATE OF DELIVERY, DATE OF RECEPTION, ETC | — | — | — | ORGANIZATION, BUSINESS DAY | — | — |
| 6 | AUTHORITY WINDOW OF ORGANIZATION | — | — | — | ORGANIZATION, WINDOW | — | — |
| 7 | SALES TAX AMOUNT | — | — | — | APPLICATION PERIOD | — | SALES TAX RATE |
| 8 | CURRENCY | — | — | — | CURRENCY CODE | — | CURRENCY RATE |

FIG. 9B

PRESENCE CHECK

| DESCRIPTION OF SUPPLIER | | | | |
|---|---|---|---|---|
| SUPPLIER CODE | SUPPLIER NAME | DATE OF START OF TRANSACTION | DATE OF END OF TRANSACTION | STOP OF APPLICATION |
| 0100 | A COMPANY | 91/01/10 | 00/00/00 | |
| 0200 | B COMPANY | 92/08/08 | 93/01/20 | |
| 0300 | C COMPANY | 93/07/07 | 00/00/00 | |
| 0400 | D COMPANY | 92/05/05 | 00/00/00 | |
| 0500 | E COMPANY | 94/07/09 | 00/00/00 | |

[SETTING WINDOW]  OK BECAUSE SUPPLIERS ARE PRESENT AS COMPANIES TO WHICH ORDERS ARE MADE

FIG. 16A

| ORDER RECEPTION | |
|---|---|
| ORDER NO. 0501 | PERSON IN CHARGE FOR ORDER    MR. D |
| DATE OF ORDER  95/06/06 | SUPPLIER CODE  0300  C COMPANY |
| MERCHANDISE CODE  4531213 | MERCHANDISE NAME    ABC APPARATUS |

[APPLICATION WINDOW]

FIG. 16B

UPPER LIMIT CHECK

| SALES AMOUNT AUTHORITY OF PERSON IN CHARGE | | | | |
|---|---|---|---|---|
| CODE OF PERSON IN CHARGE 95010 | | | | |
| DATE OF START OF APPLICATION | DATE OF END OF APPLICATION | SALES AMOUNT AUTHORITY | STOP OF APPLICATION | |
| 95/04/01 | 96/03/31 | 500,000 | | |
| 96/04/01 | 97/03/31 | 700,000 | | |
| 97/04/01 | 00/00/00 | 1,000,000 | | |

[SETTING WINDOW]    (OK BECAUSE THE SALES AMOUNT AUTHORITY IS 700,000 OR LESS)

FIG. 17A

| ORDER RECEPTION | | | | |
|---|---|---|---|---|
| ORDER NO. 970509 | | CODE OF PERSON IN CHARGE FOR ORDER | | 95010 |
| DATE OF ORDER 97/01/30 | | CLIENT | | X COMPANY |
| MERCHANDISE CODE | MERCHANDISE NAME | QUANTITY | UNIT PRICE | AMOUNT |
| 0100 | ABC APPARATUS | 10 | 100 | 1000 |
| 0200 | XYZ APPARATUS | 10 | 150 | 1500 |
| | | | TOTAL AMOUNT | 2,500 |

[APPLICATION WINDOW]

FIG. 17B

LOWER LIMIT CHECK

| DESCRIPTION OF DAYS REQUIRED FOR MERCHANDISE DELIVERY ||||| |
|---|---|---|---|---|
| MERCHANDISE CODE 4531213 ||  MERCHANDISE NAME ABC APPARATUS |||
| DATE OF START OF APPLICATION | DATE OF END OF APPLICATION | DAYS REQUIRED FOR DELIVERY | STOP OF APPLICATION | |
| 94/04/01 | 95/03/31 | 5 | | |
| 95/04/01 | 96/03/31 | 4 | | |
| 96/04/01 | 97/03/31 | 3 | | |
| 97/04/01 | 00/00/00 | 2 | | |

[SETTING WINDOW]          OK BECAUSE THE VALUE OF DELIVERY PERIOD IS LARGER THAN THE DATE OF ORDER + 2 DAYS

FIG. 18A

| ORDER RECEPTION |||
|---|---|---|
| ORDER NO. 01040 || CLIENT  Z COMPANY |
| DATE OF ORDER 97/07/07 || DATE OF DELIVERY 97/07/10 |
| MERCHANDISE CODE 4531213 || MERCHANDISE NAME ABC APPARATUS |
| QUANTITY 100 | UNIT PRICE 95 | AMOUNT 9,500 |

[APPLICATION WINDOW]

FIG. 18B

UNIT CHECK

| MERCHANDISE SALES SET | | | | |
|---|---|---|---|---|
| MERCHANDISE CODE 4531213 | | MERCHANDISE NAME | ABC APPARATUS | |
| DATE OF START OF APPLICATION | DATE OF END OF APPLICATION | SALES SET | STOP OF APPLICATION | |
| 95/04/01 | 96/03/31 | 10 | | |
| 96/04/01 | 97/03/31 | 50 | | |
| 97/04/01 | 00/00/00 | 100 | | |

[SETTING WINDOW]            OK BECAUSE THE SALES SET
                            INDICATES A MULTIPLE OF 50

FIG. 19A

| ORDER RECEPTION | |
|---|---|
| ORDER NO. 01030 | PERSON IN CHARGE FOR ORDER RECEPTION  MR. B |
| DATE OF ORDER 97/03/03 | CLIENT    X COMPANY |
| MERCHANDISE CODE 4531213 | MERCHANDISE NAME  ABC APPARATUS |
| QUANTITY    100 | UNIT PRICE   95 |
| | AMOUNT    9,500 |

[APPLICATION WINDOW]

FIG. 19B

EDITING

| DESCRIPTION OF MERCHANDISE UNIT PRICE FOR EACH QUANTITY | | | | | |
|---|---|---|---|---|---|
| MERCHANDISE CODE 4531213 | | MERCHANDISE NAME | | ABC APPARATUS | |
| DATE OF START OF APPLICATION | DATE OF END OF APPLICATION | QUANTITY RANGE | | UNIT PRICE | STOP OF APPLICATION |
| 97/04/01 | 00/00/00 | 0 | 99 | 100 | |
| 97/04/01 | 00/00/00 | 100 | 199 | 95 | |
| 97/04/01 | 00/00/00 | 200 | 299 | 90 | |
| 97/04/01 | 00/00/00 | 200 | 399 | 85 | |

[SETTING WINDOW]  OK BECAUSE THIS CASE CORRESPONDS TO THE UNIT PRICE OF 90, WHICH IS THEN EDITED ON THE WINDOW TO SET THE VALUE

FIG. 20A

| ORDER RECEPTION | |
|---|---|
| ORDER NO. 01020 | PERSON IN CHARGE FOR ORDER RECEPTION   MR. A |
| DATE OF ORDER 97/06/01 | CLIENT    X COMPANY |
| MERCHANDISE CODE 4531213     QUANTITY    250 UNITS | MERCHANDISE NAME  ABC APPARATUS         UNIT PRICE   ¥90             AMOUNT      ¥22,500 |

[APPLICATION WINDOW]

FIG. 20B

APPARATUS FOR AUTOMATICALLY APPLYING AND PREPARING SOFTWARE, AND RECORDING MEDIUM FOR PREPARING SOFTWARE

This is a continuation under 37 CFR 1.53(b) and 35 USC 120 of a prior co-pending U.S. patent application naming the same inventors entitled "APPARATUS FOR AUTOMATICALLY APPLYING AND PREPARING SOFTWARE, AND RECORDING MEDIUM FOR PREPARING SOFTWARE", filed Jul. 22, 1998, Ser. No. 09/120,987.

BACKGROUND OF THE INVENTION

The present invention relates to an apparatus and software recording medium which can detect the meaning of input data when a businessman simply enters data without being aware of the conventionally practiced description of a program language (e.g., COBOL and FORTRAN) in accordance with a flow chart in preparing software and, more particularly, to an apparatus for automatically applying and preparing software and a recording medium for preparing software, capable of automatically selecting and applying software for processing the input data in accordance with the meaning of the input data upon detecting the meaning of the input data.

To conventionally create software, a routine for applying this software is designed in a flow chart, the program language is described in accordance with the flow chart, and the program language is then encoded into the machine language.

According to this method, however, the program language must be checked as a whole and corrected when the programmer wants to change setting conditions and dates in software data processing. Therefore, it takes time to change the design of the program, or jobs by specialists are required.

Even a simple change in processing contents and conditions of the conventional program becomes expensive, takes time, and requires the jobs of specialists.

BRIEF SUMMARY OF THE INVENTION

It is, therefore, an object of the present invention to provide an apparatus for automatically applying and preparing software and a recording medium for preparing software, capable of automatically applying and preparing data processing software by detecting the meaning and contents of a data input when the user simply inputs the data without being aware of the description of a program language (e.g., COBOL or FORTRAN).

In order to achieve the above object according to the present invention, there is provided an apparatus for applying and preparing software, comprising a file storing various kinds of business worksheets each including at least one business logic term representing a minimum unit in a business operation, rule setting means for displaying a given one of the business worksheets which corresponds to user selection information on a display to indicate a data input position of the given business worksheet together with a corresponding business logic term, a business data file for, when data is input to the data input position, storing the input data as business rule setting data, using means for inputting application data corresponding to the business logic term stored in the business data file, and business logic applying means for, when the application data is input, determining software to be used in correspondence with the business logic term corresponding to the application data, performing arithmetic processing by the determined software using the application data and the business rule setting data corresponding to the application data, and obtaining an arithmetic processing result.

According to the above means, in designing a program, rule setting data is input to a data input position accompanying to a business logic term on a business worksheet. The rule setting data is made to correspond to software for processing this rule setting data as reference data, on the basis of the meaning of the business logic term. This operation is a rule setting data input job for pursuing business operation rather than program design operation.

When application data corresponding to the above rule setting data is input in use of the apparatus, the application program is automatically selected and executed, thereby obtaining the processing result represented by the business term.

According to the present invention, there is provided a recording medium for applying and preparing software, comprising a worksheet file section storing various kinds of business worksheets each including at least one business logic term representing the minimum unit in a business operation, rule setting software for displaying a given one of the business worksheets which corresponds to user selection information on a display to indicate a data input position of the given business worksheet together with a corresponding business logic term, a business data file section for, when data is input to the data input position, storing the input data as business rule setting data, first use software for inputting application data corresponding to the rule setting data stored in the business data file section, and second use software for, when the application data is input, determining software to be used in correspondence with the business logic term corresponding to the application data, performing arithmetic processing by the determined software using the application data and the business rule setting data corresponding to the application data, and obtaining an arithmetic processing result.

In designing a program, the above recording medium is operated on the computer to allow the user to input rule setting data in a data input position accompanying to the business logic term on the business worksheet. The rule setting data is made to correspond to software for processing this rule setting data as reference data.

When application data corresponding to the above rule setting data is input in use of the computer, the application program is automatically selected and executed, thereby obtaining the processing result represented by the business term.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments give below, serve to explain the principles of the invention.

FIGS. 3A and 3B are views showing windows in use of an apparatus of the present invention;

FIG. 4 is a view showing the table of a business logic applying section;

FIGS. 6A to 6Z are tables of business logic applying section or data file;

FIGS. 7A-1, 7A-2, 7B-1, 7B-2 and 7B-3 are tables of the business logic applying section or data file;

FIGS. 8A-1, 8A-2, 8B-1, 8B-2 and 8B-3 are tables of the business logic applying section or data file;

FIGS. 9A and 9B are tables of the business logic applying section or data file;

FIGS. 16A and 16B are views showing window examples in use of the apparatus of the present invention;

FIGS. 17A and 17B are views showing other window examples in use of the apparatus of the present invention;

FIGS. 18A and 18B are views showing still other window examples in use of the apparatus of the present invention;

FIGS. 19A and 19B are views showing still other window examples in use of the apparatus of the present invention; and FIGS. 20A and 20B are views showing the still other window examples in use of the apparatus of the present invention.

DETAILED DESCRIPTION OF THE INVENTION

The preferred embodiments of the present invention will be described in detail with reference to the several views of the accompanying drawing.

Figure 1:
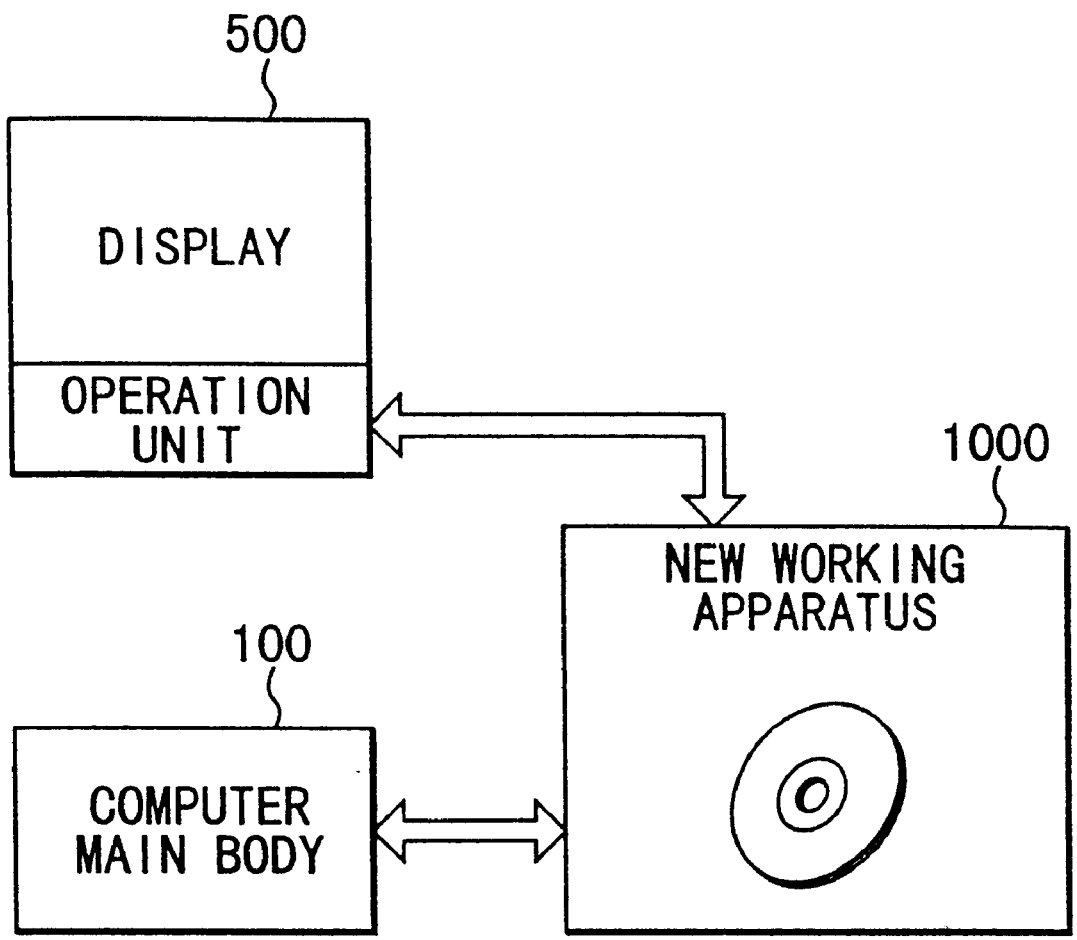
FIG. 1 is a block diagram showing the basic concept of the present invention.

FIG. 1 shows an embodiment of the present invention. Reference numeral 100 denotes a computer main body constituted by hardware and an operation system (OS). Reference numeral 500 denotes a display; and 1000, a new working apparatus of the present invention, which is constituted by a recording medium and its drive unit (to be described later), or an IC logic block.

Figure 2:
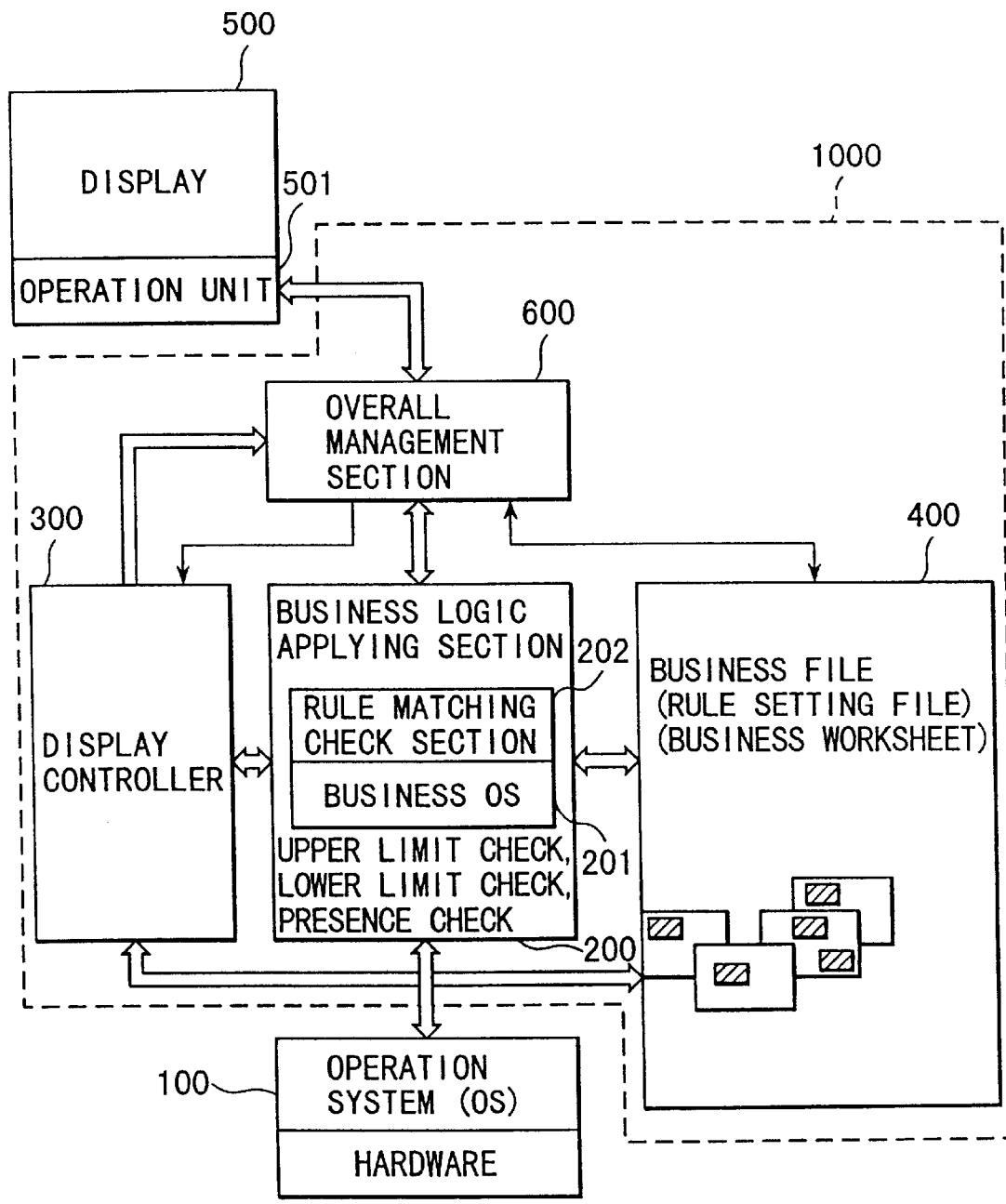
FIG. 2 is a block diagram showing the overall arrangement of an embodiment of the present invention.

FIG. 2 shows the details of the embodiment of the present invention. The computer main body is constituted by hardware and the operation system (OS). A business logic applying section 200 is mounted in the computer main body 100. The business logic applying section 200 is constituted by a business operation system (business OS) 201 and a business rule matching/check section 202.

The business operation system (business OS) is predetermined software such as presence check software, upper limit check software, lower limit check software, and total amount processing software. These software programs are used as common software programs for various processing operations.

The business rule matching/check section 202 serves as a determination section for determining which software is used when business operation system software is used on the basis of the business logic terms of a business worksheet in data processing (to be described later).

The business worksheets, business logic terms, and rule setting data are stored in a business data file 400. The business data file 400 stores, as data, various types of worksheets such as a rule setting register, a slip, and a plan for rule setting required in business operations, and a slip, a book and slip, an order slip, a settling slip used in distribution business. Each worksheet includes at least one business logic term representing the minimum unit in a business operation.

A data input position is present in correspondence with the business logic term. In designing a program, when data is input to the data input position of a plan or a rule setting worksheet, this input data serves as rule setting data. Upon inputting the rule setting data, when data is input to a data input position of a worksheet such as a rule confirmation or estimate in use of a computer in a business operation, this data serves as application data.

The display 500 displays a worksheet when a program is to be created or used upon creation of the program. The display 500 is used to confirm the user data input or the program processing result. In preparing and using a program, an overall management section 600 operates in response to an input operation from the operation unit and accesses peripheral block data or starts the peripheral block. At the same time, the overall management section 600 controls data input/output timings.

In response to the operation input through the overall management section 600, a display controller 300 determines a specific one of the worksheets to be displayed. The display controller 300 reads out data from the business data file 400. Data accompanying to the readout worksheet is also read out. The readout data and worksheet are transmitted through the overall management section 600 and displayed on the display 500.

For example, the worksheet describes business logic terms, as shown in FIG. 3. Data can be filled in blank portions (data input positions) corresponding to these business terms. This example is a worksheet with which a credit amount is set for a client. The title "Description of Credit Amount for Client" is set in this worksheet. To read out this worksheet, an operation called the start of program preparation (or business rule setting) is performed from an operation unit 501. For example, if the menu requests a desired title, the title menu corresponding to the request appears. The user refers to the title menu and clicks the title "Description of Credit Amount for Client". Therefore, the worksheet is displayed on the display.

The overall management section 600 activates the system and responds to an input from the operation unit 501.

Since the data processing contents corresponding to the item "Description of Credit Amount for Client" are predetermined, the business logic applying section 200 has data representing the correlation between software for performing this data processing and the worksheet.

In the display state shown in FIG. 3A, the client number and the company name are input. This worksheet also has columns of the date of start of application, the date of end of application, the credit amount, and the stop of application. Necessary data are filled in these columns, respectively. In this example, the date of start of application is Jun. 6, 1997, and the credit amount is 200,000,000. No data are filled in the columns of the date of end of application and the stop of application. When no data are filled, data processing for these business logic items are not automatically performed.

A worksheet for creating a sales merchandise list of a client is also stored in the business logic applying section 200. Various types of data of the client (these data are called business rule setting data hereinafter) can be created.

When necessary rule setting data are filled in the necessary worksheet, the end of window display is clicked. Each worksheet is stored in the business data file 400. Since the necessary data processing in a business operation is predetermined depending on the types (contents) of the rule setting data, a program to be applied to each data can be determined upon the data input.

In actual use of the computer, when application data is input to check a client for, e.g., the above-mentioned credit amount, it must be determined whether the application data is appropriate. The upper limit check processing is performed by comparing the application data with the previously input credit amount (business setting and by determining whether the amount represented by the application data exceeds the value of the business rule setting data.

More specifically, according to the present invention, business application software is perfectly separated into business logic and program logic (computer logic) in accordance with a predetermined reference, and the arrangement of the apparatus is considered base on this separation. Elements of the predetermined reference are slips and references. And computer windows, computer books, slips for business worksheets (business documents) and items expressed in the worksheets are made.

Further then business data are classified into a business transaction know-how data group (meaningful minimum unit elements for determining the contents of a business contract and the like), a basic business operation data group (meaningful minimum unit elements such as company rules for, pursuing the contract), and an account data group (meaningful minimum units such as accounting processing rules based on the Commercial Code, the tax law, the commercial transaction law). These data groups are made to corresponding to application software programs for processing these data groups. More specifically, the data groups are made to correspond to application software programs such as an upper limit check program, a lower limit check program, a presence check program, and an total amount processing program.

The data are separated and arranged as described above. Only the mechanism for processing the above items is left as the program logic to constitute the application software. This is the business OS. These business items are simple data if their contents are known. These are business data.

The software (business OS) stored in the business logic applying means is a software group for performing upper limit check processing, the lower limit check processing, the presence check processing, and the total amount processing using the application data (i.e., data input when the apparatus of the present invention is used in actual business transaction and the corresponding business rule setting data (data stored as a database in advance).

Referring back to FIG. 3, a database using a worksheet is prepared. The above example is the case in which the credit amount is set for a given client. In addition, a client company list database, database of sales merchandise for clients, data of unit prices and quantity information of the sales merchandise can also be prepared.

FIG. 3B shows an application window when a client, ABCDE Co. made an order. In this case, an application worksheet is read out as the worksheet. As shown in FIGS. 3A and 3B, accessed information is input to each necessary position. More specifically, the client code, the client name, the merchandise code, the unit price, the quantity, and the amount of order received are input. When these data are input, the start is instructed. The apparatus is switched to the application mode by the operation unit 501, and the user requests the menu of the above application window for its worksheet. The display controller 300 displays the title of the application worksheet. When a desired title, i.e., "order reception" is present, the user clicks the title.

The application window shown in FIG. 3B is obtained on the display 500. The user then inputs data. When the start of inquiry is operated by the user, it is determined whether the amount of order received exceeds the credit amount (upper limit check processing). At this time, the software is executed as follows. The business logic applying unit 200 detects the item defined as the amount of order received, automatically selects the upper limit check processing software, and then executes this software. The resultant data is displayed as "within the credit amount" or "over the credit amount" is displayed on the display 500 through the display controller 300 and the overall management section 600.

FIG. 4 shows a correlation table among the worksheets, the business logic terms described in the worksheets, the worksheet group data in which the business logic terms are present, and application software. The business data file 400 or the business logic applying section 200 has this correlation table to detect the worksheet currently accessed on the display 500, detects the corresponding business logic term when data is input, and determines the application software. Data obtained upon applying the software is fed back as a window on the display again. The table in FIG. 4 can be described in either the business logic applying section 200 or the business data file 400.

The above embodiment has described the basic principle of the present invention. The present invention is not limited to the above embodiment. The business logic terms are merely examples. All the items such as various types of slips, books and slips, and settling slips correspond to the business logic terms of the present invention. These terms are used as the references that the business logic applying section selects appropriate software.

Figure 5:
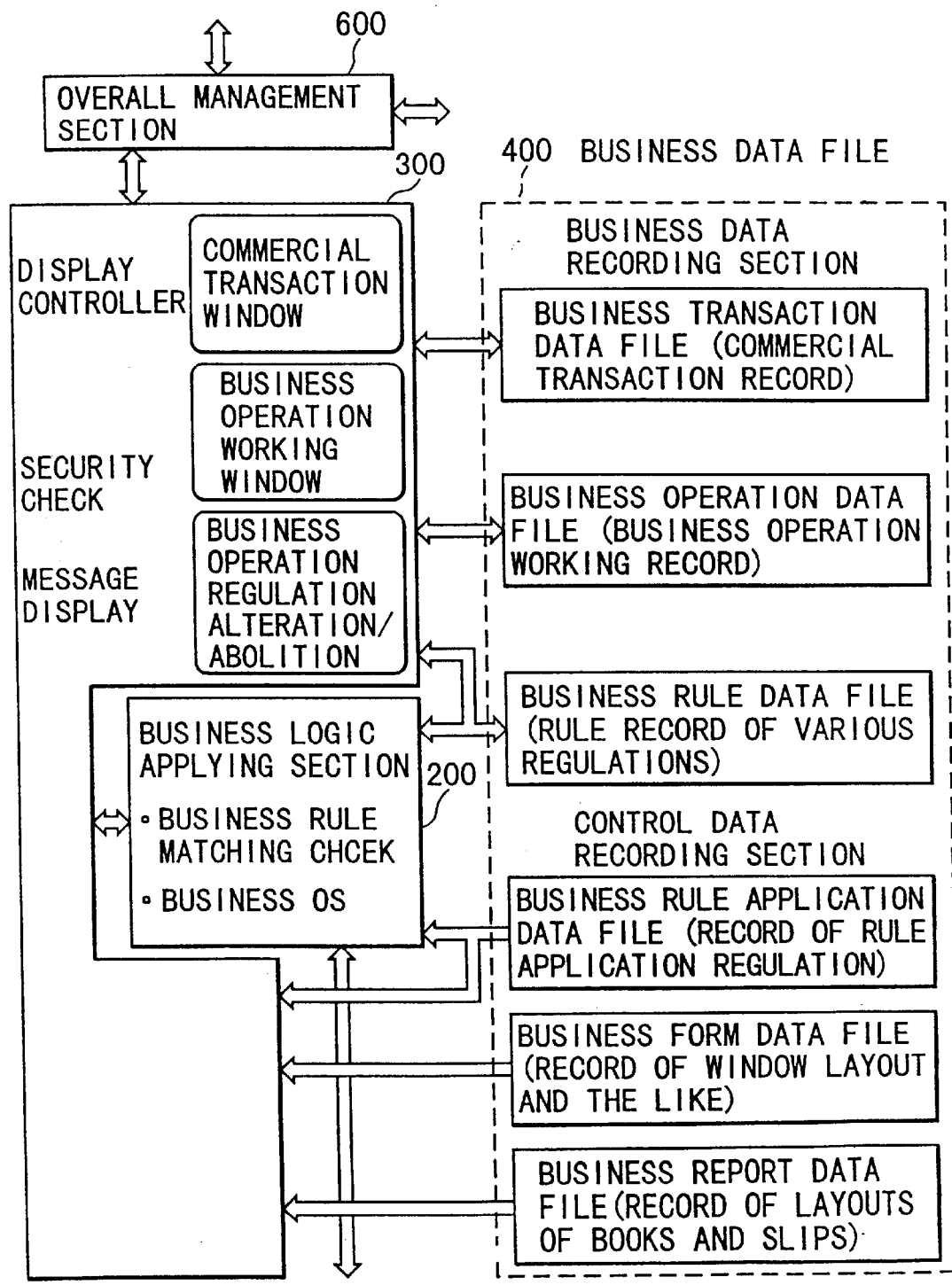
FIG. 5 is a block diagram showing the detailed arrangement of the apparatus of the present invention.

FIG. 5. is a block diagram showing the detailed arrangement of the present invention.

The same reference numerals as in FIG. 2 denote the same parts in FIG. 5. The data in the business data file 400 in FIG. 2 are classified using the worksheet and the data applied to the items described in this worksheet.

In addition, the data in FIG. 5 are classified in accordance with the natures. The data natures are classified into frequently updated simple data and semipermanent data. In FIG. 5, the simple data are collected in a business data recording section, while the semipermanent data are collected in a control data recording section.

The data in the business data recording section are further classified, depending on the types, into a business transaction recording section, a business operation recording section, and a rule (e.g., various regulations) recording section.

When these data are updated, the results are left as a record (history).

The transaction time, the company, and the contents of a transaction are left as a business transaction record. The operation proceeding data, the accounting history data, and the personnel management history data are recorded as a business operation record. Various regulation data (e.g., data before and after changes in office regulation) and data before and after changes in credit amount of a client company are recorded as a business rule record. Information representing a change in purchase quantity of merchandise of a client company, and the like are also recorded in the business data recording section. The business data recording section also serves as a recording section for recording a value of a special sales merchandise sold at a discount.

The data in the control data recording section are classified, depending on the types, into a rule applying regulation recording section, a window layout recording section, and a book and slip layout recording section. As described with reference to FIG. 4, the logic term of a worksheet, and a table representing the relationship between the logic term and the associated software are described in the rule applying section.

In the above description, for better understanding of functions, the overall management section 600, the business logic applying section 200, and the display controller 300 are illustrated as the separate blocks, but may be integrated with each other.

In the above system, the rule setting data input position for inputting the date of application as the business logic term for setting the business rule is present on the worksheet. That is, the worksheet has time axis information which is effectively utilized. The date of start of application and the date of end of application are present for the lapse of time and the date of application. The data input positions are present for these items. To input the date of application, a means for requesting a password key input concomitently operates in the rule setting means.

The operation unit 501 can be immediately operated to change the rule setting data in the presence of these functions when the user wants to stop business transactions with a plurality of client companies or to stop importing some merchandise from a supplier. For this reason, the operation speed in business operations can increase. When this system is applied to business operations, business operation management has high reliability, and the system has a high utilization value. In addition, the system can immediately cope with a change of rate in foreign currency.

Since the business rule data representing the past rule records are present in this system, data currently accessed at a past rate can be easily calculated.

From FIG. 6A, the detailed tables of business operations arranged in the business logic applying section 200 are shown. The correlation tables among the respective business operation processing, the business operation contents, windows to be used, the books on which data are to be recorded, and ledgers.

FIGS. 6A to 6Z show business operation processing standards. The columns of each standard has computer business operation processing (business operation processing minimum unit reference/computer business operation processing reference), a rule setting business operation, a commercial transaction operation, a distribution operation, a circulation operation, a manufacturing operation, slips (slip filling reference/window design reference) for recording basic business operations, books/slips/ledgers for recording basic business operations, a Commercial Code reference, an accounting reference, a tax reference, and a securities exchange reference are sequentially formed from the left column. A circle in each column represents a flag.

For example, the columns having No. 17 in FIG. 6B describe the processing contents for opening the transaction account of a client. To execute this processing is to execute rule setting business operation. An item representing the opening of the transaction account of a client is clicked in the menu. An account-opening slip for the transaction account is displayed in the window in order to open the account. The user operates the apparatus while viewing the window, so that the data described in this slip is described in a client book (file) as client data. When the data is added as described above, the Commercial Code reference, the accounting reference, the tax reference, and the commercial transaction reference are applied. The following meaning is described in the columns having No. 79 in FIG. 6G. No. 79 represents the shipping instruction of sales merchandise. This belongs to the commercial transaction operation. When a shipping instruction is to be issued, the note of shipment of the sales merchandise is read on the window, and the operator enters data (e.g., permission and quantity). This data is described in the shipping instruction register. The stock or the like can be calculated when using the input data (e.g., permission and quantity). Software for processing this data (e.g., permission and quantity) can be determined. For example, inventory processing of the sales merchandise having No. 111 in. FIG. 6I can be executed using the determined software.

A database associated with each business operation can be prepared by preparing the business operation processing standard table as described above. In addition, software can be automatically determined when the data of such a database are used. A program for associating these data with software is stored in, e.g., the overall management section 600.

FIGS. 7A-1 to 8B-3 show the tables of contents (rules) by which the apparatus of the present invention operates in performing an order reception operation and an ordering operation. FIGS. 7A-1, 7A-2, 7B-1, 7B-2, and 7B-3 represent one table, and FIGS. 8A-1, 8A-2, 8B-1, 8B-2, and 8B-3 represent one table. This table has the columns of business operation processing rule, business operation processing rule logic, business operation processing rule application item, and business operation rule check item from the left column. For example, when confirmation of purchase merchandise having No. 1 in FIG. 7A-1 is selected from the menu, it is checked if the purchase merchandise is purchasable. A window for inputting the name of the purchase merchandise and its code is displayed in the window. When the user inputs appropriate data while watching the window, the check is started on the basis of the determination in the business logic applying section 200. A supplier, and the presence of a supplier organization are automatically checked while referring to the database. When confirmation of the appropriate stock of the purchase merchandises having No. 6 and whether the total stock is proper are selected, the appropriate stock of purchase merchandises is checked. At this time, the user inputs the quantity of order in the item, "order purchase merchandise" appearing in the window. The total stock is automatically checked. This check is the upper limit check to determine whether the quantity of order exceeds the total stock. In addition, it is also checked if this purchase merchandise is stocked FIGS. 9A and 9B show a business rule table applied to confirm the presence of a person in charge in ordering or order reception. FIGS. 9A and 9B constitute one table.

In the above table, some items are exemplified, but other items can also be used in the same manner as described above.

User's operation of the apparatus of the present invention when installing the apparatus will be briefly described below.

The new working apparatus can be prepared by a data control type business application recorded on, e.g., a recording medium. The application is installed in the computer main body using a setup program.

Figure 10:
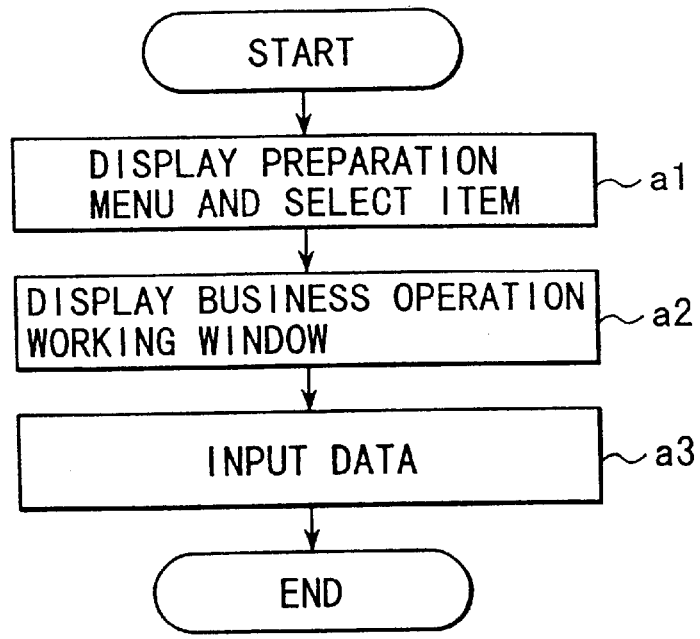
FIG. 10 is a flow chart of an operation routine when the apparatus of the present invention is used.

FIG. 10 shows an operation example in the preparation stage in which the apparatus of the present invention is used in business operations. Overall unit management is performed by the overall management section 600, and the operation order of the respective units, data search, data output, and the like are controlled by the overall management section 600.

In the preparation, stage, items whose flags are set in the columns of the rule setting operations in the tables from FIG. 6B are processed. For example, assume that the operation unit is operated to use the apparatus for business operation working. A business operation working window (worksheet) for preparing for a data file is displayed on the display from a working preparation menu (steps a1 and a2). While viewing the window, the user inputs business setting data in the black portions of appropriate items (step a3) to prepare a business operation data file. A similar processing routine is executed to set a business operation rule.

Figure 11:
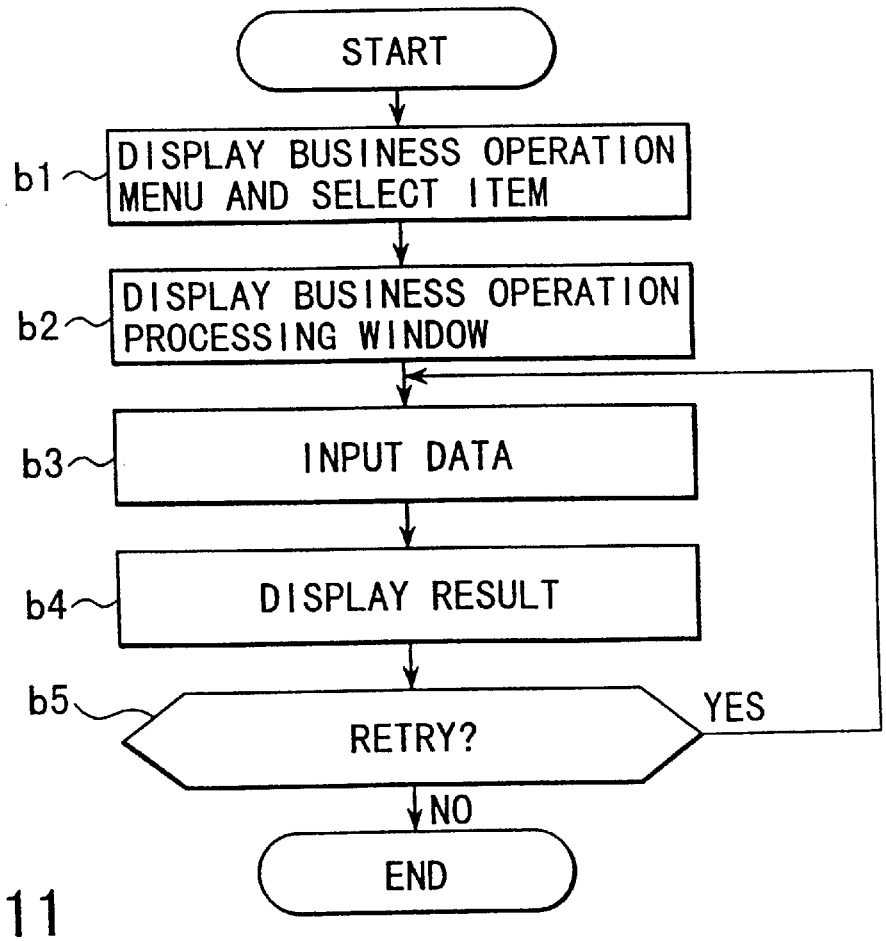
FIG. 11 is a flow chart of another operation routine when the apparatus of the present invention is used.

FIG. 11 shows an operation example for using a data base (control data) thus prepared. In a business operation menu display state, when the user selects a target item in the menu (step b1), the window is changed to a business operation processing window (step b2) corresponding to the selected item. The user inputs necessary data while viewing the business operation processing window (b3). The business logic applying section 200 intelligently determines necessary software using the tables shown in FIGS. 6A-1 to 9B in accordance with the types of input data, and displays the processing result (step b4). The user retries the operation upon checking the processing result or enters OK (step b5).

Figure 12:
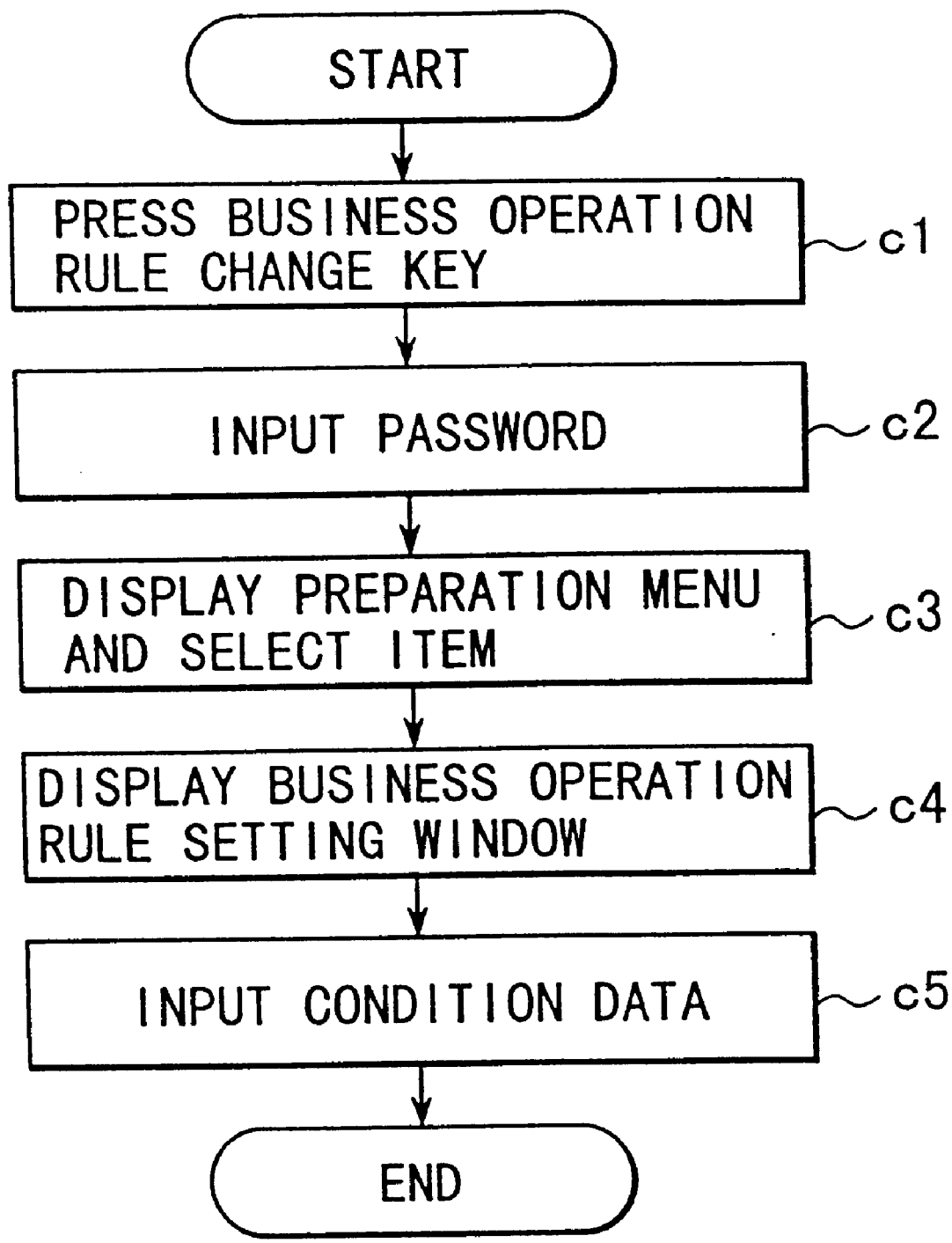
FIG. 12 is a flowchart of still another operation routine when the apparatus of the present invention is used.

FIG. 12 shows a processing sequence used when a business operation rule must be changed. When the user operates the business operation rule change key, a prompt is displayed to input a password with keys (c1 and c2). This aims at preventing anybody from arbitrarily changing the rule. When the password is input, a preparation menu is displayed as in the above preparation. The user selects an item for changing the rule from the displayed menu (step c3). When the business operation rule setting window appears, condition data is input to a necessary portion (step c5).

Several examples will be described below.

(1) Check of Account of Client in Order Reception Operation
  (a) Preparation for Order Reception . . . the client is registered in this preparation.
  (b) Actual Order Reception Operation Time . . . it is checked if the client is registered in advance.
(2) Check of Credit Amount in Order Reception Operation
  (a) Preparation for Order Reception. . . the client is registered, and its credit amount is registered.
  (b) Actual Order Reception Operation Time . . . it is checked if the sum of the account receivable of the client and the amount of order exceeds the credit amount.
(3) Check of Authority of Person in Charge in Order Reception Operation
  (a) Preparation for Order Reception . . . the person in charge is registered, and the upper limit amount of the sales authority of the person in charge is registered.
  (b) Actual Order Reception Operation Time . . . it is checked if the total amount of order received exceeds the upper limit amount of the sales authority of the person in charge.

The present invention is not limited to the above embodiment, various changes and modifications can be made.

Figure 13A:
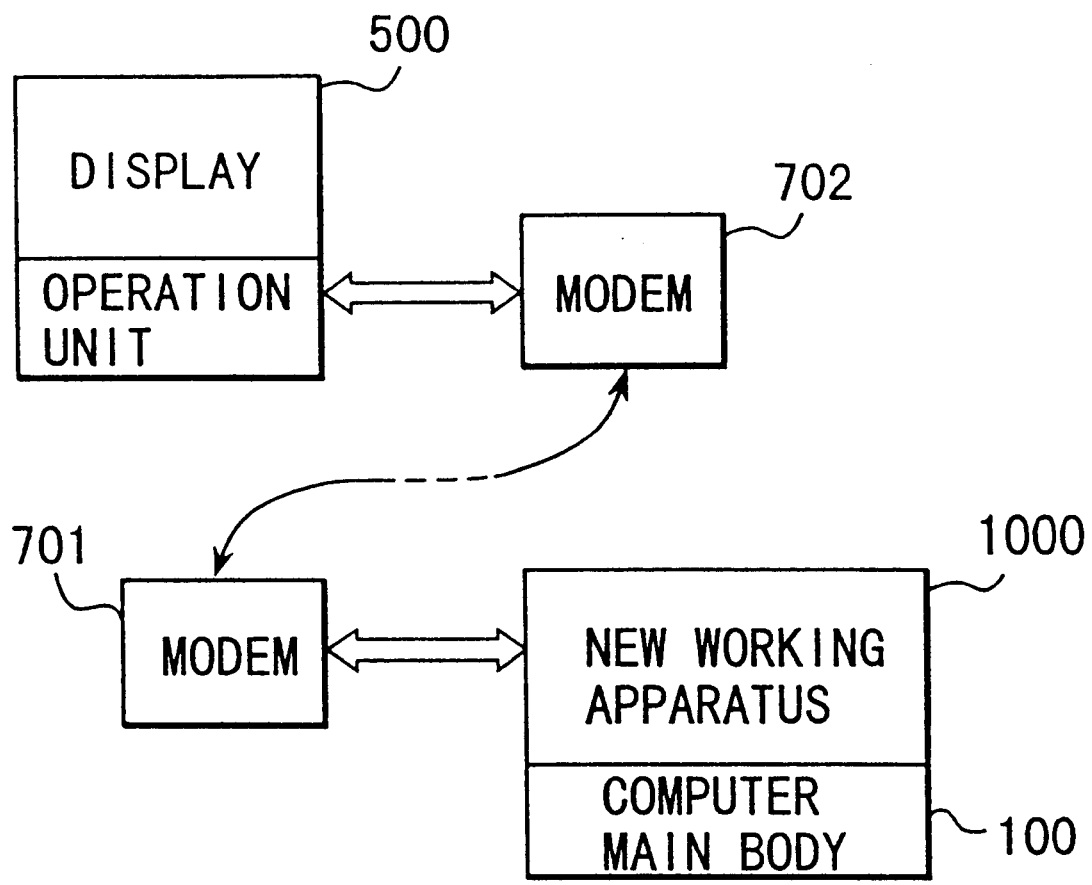
FIGS. 13A to 13C are block diagrams showing apparatuses according to other embodiments of the present invention.

FIG. 13A shows an arrangement in which a display 500 and a new working apparatus 1000 are connected through data transmission/reception units (modems) 701 and 702. With this arrangement of the apparatus, business data processing and business rule setting can be performed at a remote location through the network. In this case, software for controlling the transmission/reception unit 701 is installed on the recording medium or in the hardware of the new working apparatus.

According to the present invention, the new working apparatus 1000 and the computer main body 100 may be arranged in a server on the network.

Figure 13B:
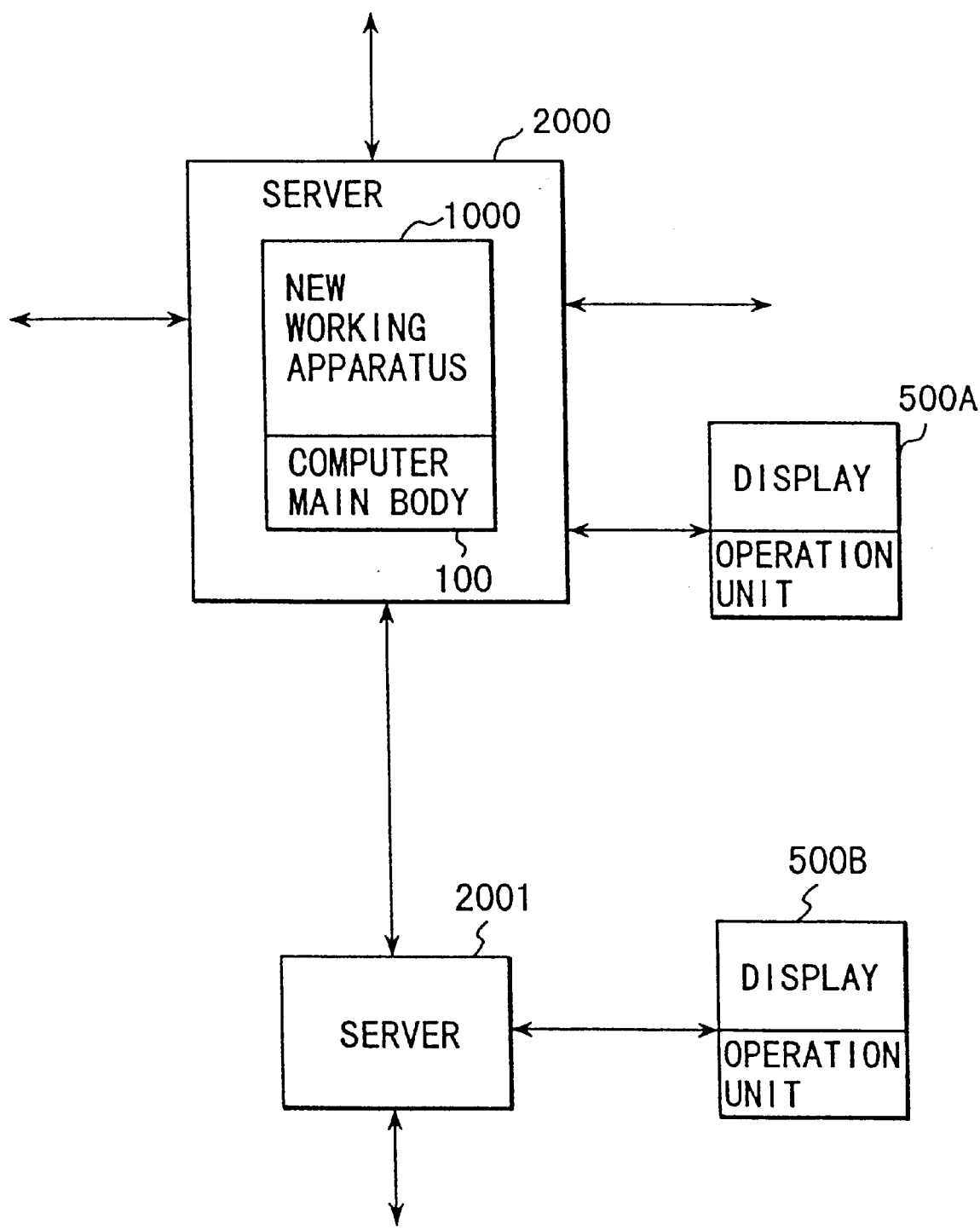

FIG. 13B shows an arrangement in which a new working apparatus 1000 and a computer main body 100 are arranged in a server 200 on the network. The new working apparatus 1000 can be accessed from a terminal 500A having a display and an operation unit. The new working apparatus 1000 can also be accessed from a terminal 500B through the server 201. In this case, each terminal must have a modem.

With the above arrangement, when the new working apparatus 1000 can issue identification codes to the respective terminals and can individually process the data from the terminals, the new working apparatus 100 can be shared by a plurality of different companies.

Figure 13C:
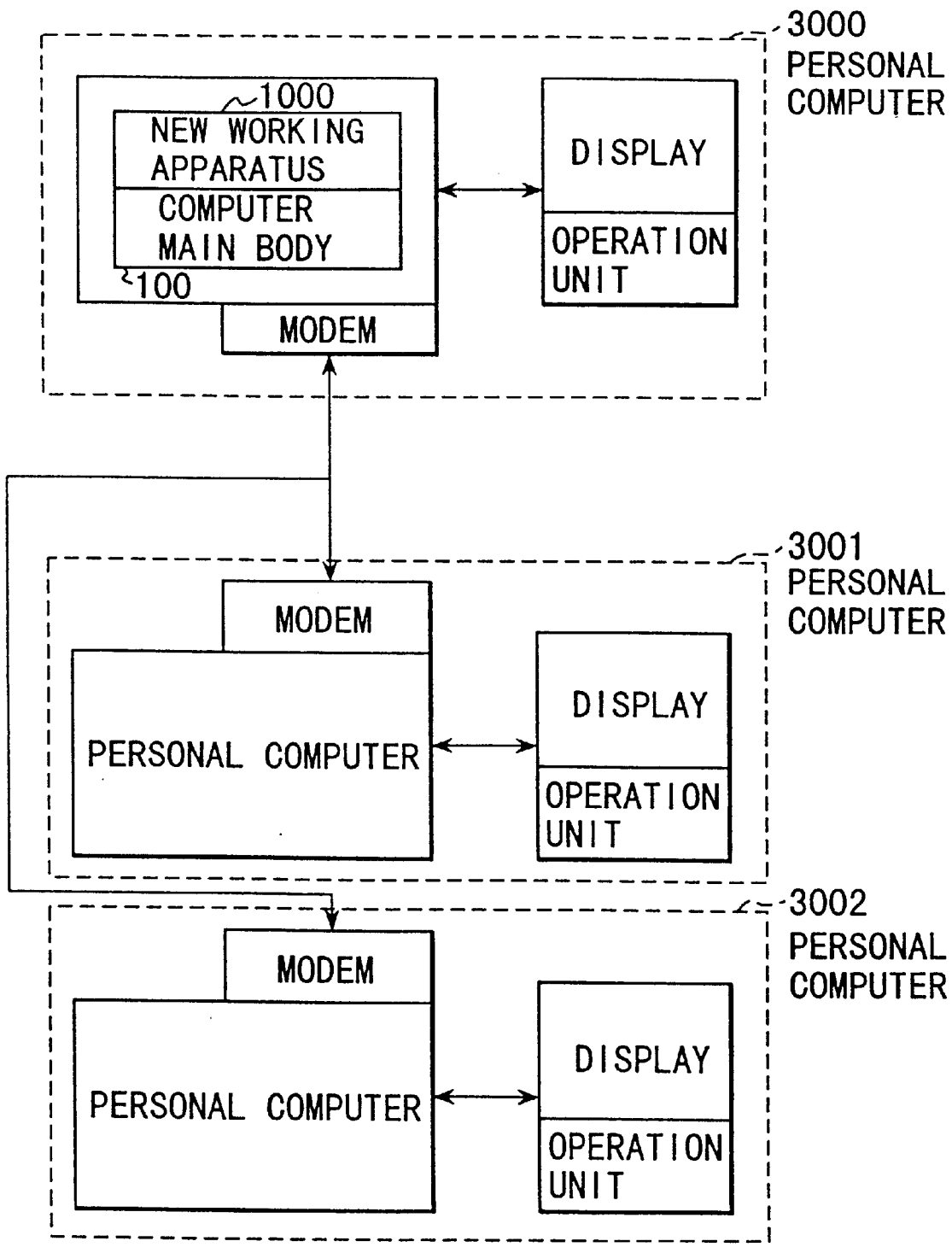

FIG. 13C shows an arrangement in which a new working apparatus 1000 and a computer main body 100 are integrated with a personal computer 3000 having a display, an operation unit, and a modem. The program-installed personal computer 3000 is connected to other personal computers 3001 and 3002 through a network. By preparing this network, the user can use the personal computers 3001 and 3002 as if the new working apparatus 1000 were owned by the personal computers 3001 and 3002.

Figure 14:
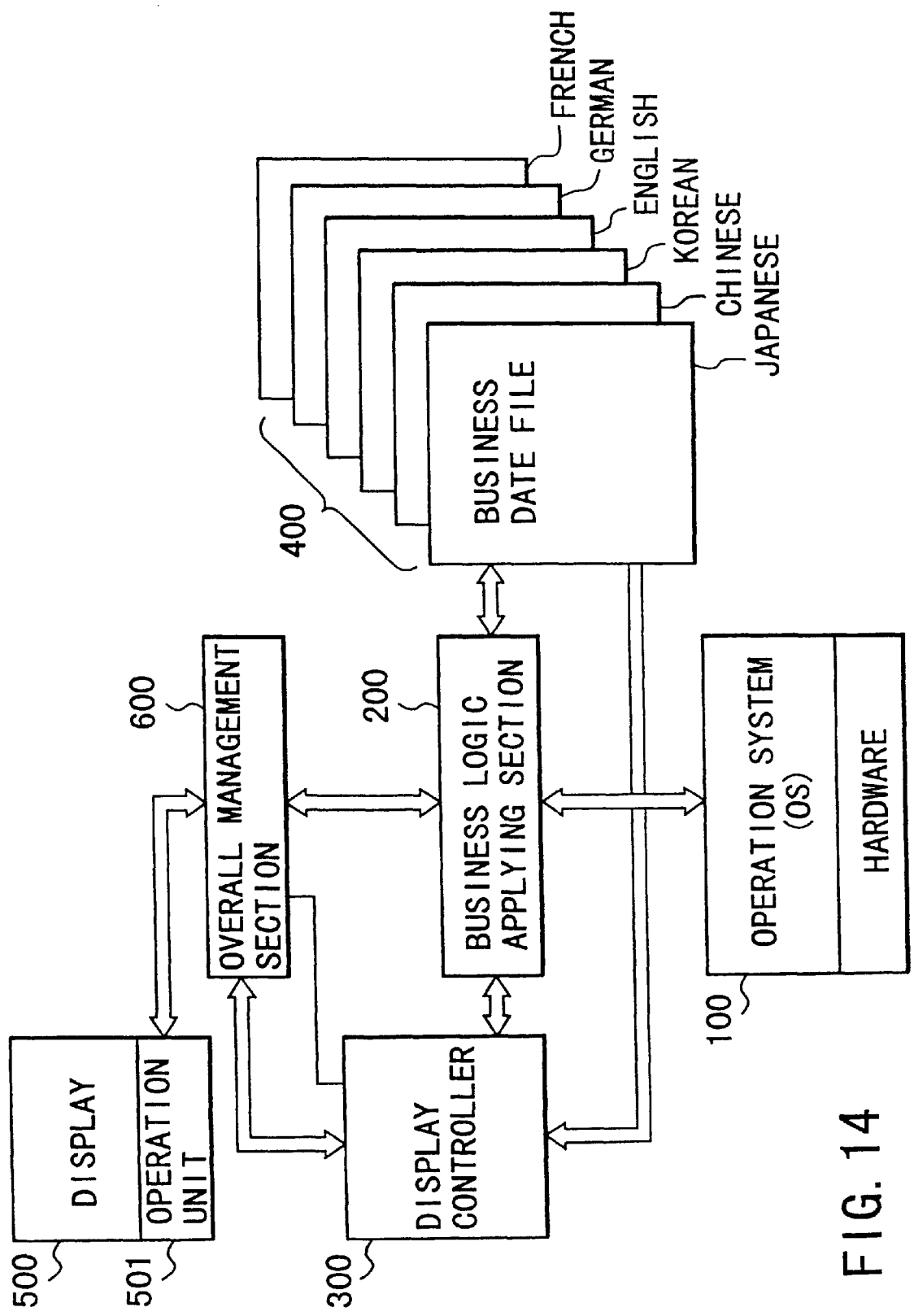
FIG. 14 is a block diagram of another business data file of the apparatus of the present invention.

FIG. 14 shows various business data files. The business data files are prepared in a plurality of languages as languages used in these files and appearing in the windows of the display. With this arrangement, the system of the present invention can be used in all countries in the world. In this case, an overall management section 600 has a language selection function, and the user can set a desired language through an operation unit 501.

Figure 15A:
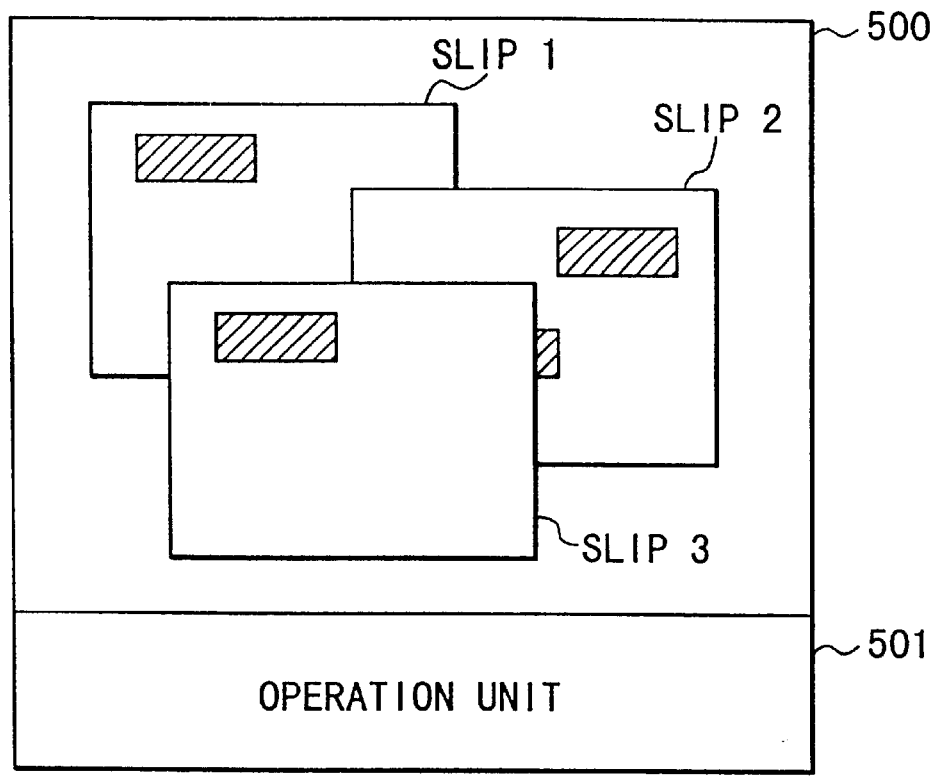
FIGS. 15A and 15B are views showing other display examples of the apparatus of the present invention.
Figure 15B:
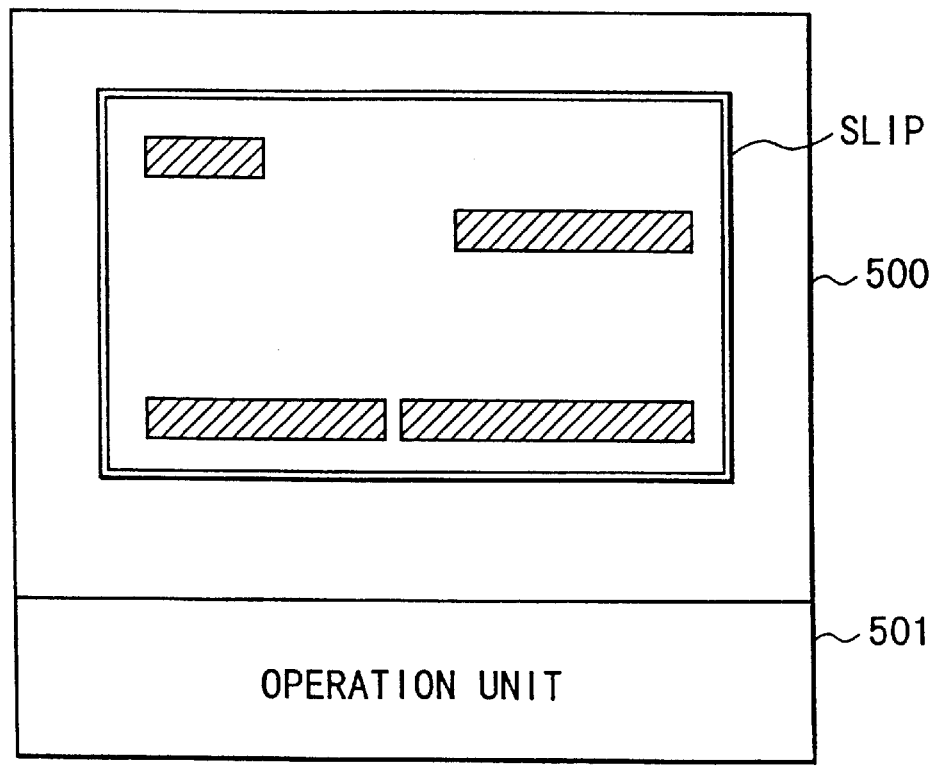

The present invention is not limited to the above embodiment. The display controller 300 also has a function of displaying a plurality of business operation processing windows (worksheets) on the display 500. More specifically, as shown in FIG. 15A, for example, slips 1, 2, and 3 can be displayed and processed in comparison. When data are input to data input positions of a worksheets, the priority of data processing may be determined in advance or the processing order may be determined in accordance with operations. As indicated by the hatched portions in FIG. 15B, for example, a slip may have a plurality of items, and the items may serve as a plurality of data input positions. In this case, the data processing order may be determined by the user or automatically determined. No data processing is performed for a blank portion having no data, as a matter of course.

The use examples of the apparatus of the present invention will be further described below.

FIG. 16A shows a rule setting window for setting a presence check rule. FIG. 16B shows a presence check application window. The rule setting window has a supplier code, a supplier name, the date of start of transaction, the date of end of transaction, and the stop of application.

Assume that the order No., the date of order, and the supplier code are input as 0501, 95/06/06, and 0300, respectively. Since this supplier is present in the data file and the date of start of transaction is appropriate, an order can be made. The information of the supplier, merchandise codes, and merchandise names are displayed. At this time, if no supplier is present, or the date of end of transaction has passed, an alarm message or sound is generated.

FIG. 17A shows a rule setting window when the rule is set for checking the upper limit of the sales amount authority of the person in charge. FIG. 17B shows the upper limit check application window. The rule setting window has, as items, the date of start of application, the date of end of application, the sales amount authority, and the stop of application. Assume that the person in charge inputs the person-in-charge code as 95010, the order reception date as 97/01/30, the client as X company, merchandise codes, merchandise names, quantities, unit prices, and the like in the order reception application window. In the application window, spreadsheet software is automatically operated to calculate the total amount. Check software is then operated to check if the total amount falls within the sales amount authority and if the date of application is appropriate. In the illustrated example, nothing appears or no alarm is generated because all the input data are appropriate.

FIG. 18A shows a rule setting window for setting a rule upon describing the number of days required for merchandise delivery. FIG. 18B shows a lower limit check application window. The rule setting window has, as items, the merchandise code, the merchandise name, the date of start of application, the date of end of application, the number of days required for merchandise delivery, and the stop of application. Assume that the person in charge inputs the order reception date as 97/07/07, the date of delivery as 97/07/10, the merchandise code, the merchandise name, the quantity, and the unit price in the order reception application window. In this case, the merchandise code is confirmed, and the sum of the order reception date and two days (the number of days required for delivery) is calculated as 97/07/09. The date of delivery desired by the user is 97/07/10. The lower limit check processing is then performed to determine that the order reception is allowed.

FIG. 19A shows a rule setting window for setting a rule for a merchandise sales set as an example of unit check. FIG. 19B shows an order reception application window. The rule setting window has, as items, the merchandise code, the merchandise name, the date of start of application, the date of end of application, the sales set, and the stop of application. Data are then input to these items.

Assume that the order reception date, the merchandise code, and the quantity are input as 97/03/03, 4531213, and 100, respectively, in the application window upon allowing order reception. In this case, since the input quantity is 100 which is twice 50, the order reception is allowed.

FIG. 20A shows a rule setting window for describing merchandise unit prices for the respective quantities. This processing belongs to edit processing. The rule setting window has, as items, the merchandise code, the merchandise name, the date of start of application, the date of end of application, the quantity range, the unit price, and the stop of application.

Assume that the order reception date, the merchandise code, and the quantity are input as 97/06/01, 4531213, and 250, respectively, in the application window. In this case, the order reception can be allowed without any problem. If the quantity is 205, the unit price is given as ¥90 according to the rule setting data. Data "90" is read out and displayed in the column of unit price. The arithmetic function is performed to calculate 90×250, and "22,500" is displayed in the column of amount.

In addition, according to the apparatus of the present invention, data processing of the same contents can be performed for a plurality of items in different conditions.

For example, when merchandise sales quantity data is present, an exchange table representing the business results in dollar, yen, and mark can be easily displayed using the business result sheet as the application window. This processing can be performed using the common program for executing the exchange rule because only the exchange conditions (rate coefficients) are different. The merchandise sales quantity data is input to the input position of the sales quantity in the business result sheet, and yen, dollar, or mark is set in the condition input position. When the apparatus of the present invention is used as described above, for example, a plurality of business result sheets are displayed, and the business results obtained upon exchange in yen, dollar, and mark can be simultaneously checked in the same window.

The above rule setting windows and application windows are merely examples. Various changes and modifications may be made within the spirit and scope of the invention.

In the above description, the new working apparatus 1000 is installed in the computer system using a recording medium such as an optical disk to prepare the respective processing routines. The present invention, however, is not limited to this. The new working apparatus 1000 itself is prepared as hardware constituting the business logic applying section 200, the display controller 300, the overall management section 600. In addition, the business data file 400 may be constituted by a hardware memory, and this portion may be constituted as a detachable recording medium such as a disk. When the business data file section is detachably arranged, it can be replaced with a new one in the change and correction of design and layout of a worksheet.

As has been described above, when the user simply inputs data without being aware of a program language (e.g., COBOL or FORTRAN), the input data meaning is detected, and software for this data processing can be automatically applied and prepared. Immediate response processing is allowed in accordance with the setting data input. Software recheck or correction need not be performed.

Additional advantages and modifications will readily occurs to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An apparatus for applying and preparing software, comprising:

a worksheet file storing various kinds of business worksheets each using at least one business logic term representing a minimum unit in a business operation, said business worksheets including rule setting worksheets for inputting business rule setting data and application data inputting worksheets for inputting application data;

rule setting means for displaying a given one of the rule setting worksheets which corresponds to user selection information on a display, on which a rule setting data input position of the given rule setting worksheet is indicated by a corresponding business logic term in such a manner that a user can input the business rule setting data to said rule setting data input position and change the business rule setting data in said rule setting data input position;

a business data file for, when data is input to the rule setting data input position, storing the input data as business rule setting data together with the corresponding business logic term;

first using means for displaying a given one of the application data inputting worksheets which corresponds to user selection information on the display, on which an application data input position of the given application data inputting worksheet is indicated by a corresponding business logic term;

second using means for inputting application data corresponding to the business logic term stored in said business data file; and business logic applying means for, when the application data is input, determining software to be used in correspondence with the business logic term corresponding to the application data, performing arithmetic processing by the determined software using the application data and the business rule setting data corresponding to the application data, obtaining an arithmetic processing result, and thereby supporting a business work of the user.

2. An apparatus according to claim 1, wherein the software used in said business logic applying means is software for performing upper limit check processing using the application data and business rule setting data corresponding to the application data.

3. An apparatus according to claim 1, wherein the software used in said business logic applying means is software for performing lower limit check processing using the application data and business rule setting data corresponding to the application data.

4. An apparatus according to claim 1, wherein the software used in said business logic applying means is software for performing presence check processing using the application data and business rule setting data corresponding to the application data.

5. An apparatus according to claim 1, wherein the software used in said business logic applying means is software for performing unit check processing using the application data and business rule setting data corresponding to the application data.

6. An apparatus according to claim 1, wherein the software used in said business logic applying means is software for performing edit processing using the application data and business rule setting data corresponding to the application data.

7. An apparatus according to claim 1, wherein the software used in said business logic applying means is software for performing total amount/comparison processing using the application data and business rule setting data corresponding to the application data.

8. An apparatus according to claim 1, wherein the business logic term is prepared in display data corresponding to a plurality of languages.

9. An apparatus according to claim 1, wherein said display and said using means are located at a remote place through a communication path.

10. An apparatus according to claim 1, comprising security means for requesting a key input of a user when the business rule setting data is input.

11. An apparatus according to claim 1, wherein said rule setting means for displaying the worksheet on said display has a function of simultaneously displaying a plurality of types of worksheets.

12. An apparatus according to claim 11, wherein when data are input to data input positions of the plurality of types of worksheets, a data processing order is predetermined.

13. An apparatus according to claim 1, wherein a date of application is input to the rule setting data input position by use of a business logic term for setting a business rule.

14. An apparatus according to claim 13, wherein the date of application includes a date of start of application and a date of end of application, and data input positions for the date of start of application and the date of end of application are present.

15. An apparatus according to claim 13, wherein means for requesting a password input is concomitantly operated in said rule setting means in order to input the date of application.

16. A recording medium for applying and preparing software, comprising:

a worksheet file section storing various kinds of business worksheets each using at least one business logic term representing a minimum unit in a business operation, said business worksheets including rule setting worksheets for inputting business rule setting data and application data inputting worksheets for inputting application data;

rule setting software for displaying a given one of the rule setting worksheets which corresponds to user selection information on a display, on which a rule setting data input position of the given rule setting worksheet is indicated by a corresponding business logic term in such a manner that a user can input the business rule setting data to said rule setting data input position and change the business rule setting data in said rule setting data input position;

a business data file for, when data is input to the rule setting data input position, storing the input data as business rule setting data together with the corresponding business logic term;

first using software for displaying a given one of the application data inputting worksheets which corresponds to user selection information on the display, on which an application data input position of the given application data inputting worksheet is indicated by a corresponding business logic term;

second using software for inputting application data corresponding to the business logic term stored in said business data file; and business logic applying software for, when the application data is input, determining software to be used in correspondence with the business logic term corresponding to the application data, performing arithmetic processing by the determined software using the application data and the business rule setting data corresponding to the application data, obtaining an arithmetic processing result, and thereby supporting a business work of the user.

17. A medium according to claim 16, wherein the second use software is software for performing upper limit check processing using the application data and business rule setting data corresponding to the application data.

18. A medium according to claim 16, wherein the second use software is software for performing lower limit check processing using the application data and business rule setting data corresponding to the application data.

19. A medium according to claim 16, wherein the second use software is software for performing presence check processing using the application data and business rule setting data corresponding to the application data.

20. A medium according to claim 16, wherein the software determined by said business logic applying software is software for performing unit check processing using the application data and business rule setting data corresponding to the application data.

21. A medium according to claim 16, wherein the second use software is software for performing edit processing using the application data and rule setting data corresponding to the application data.

22. A medium according to claim 16, wherein the software determined by said business logic applying software is software for performing total amount/comparison processing using the application data and business rule setting data corresponding to the application data.

23. A medium according to claim 16, wherein the business logic term is prepared in display data corresponding to a plurality of languages.

24. A medium according to claim 16, wherein software for displaying data on said display includes transmission/reception control software.

25. A medium according to claim 16, wherein the rule setting software includes procedure means for performing security check for requesting a key input of the user when the business rule setting data is input.

26. A medium according to claim 16, wherein rule setting software for displaying the worksheet on said display has a processing routine for displaying a plurality of types of worksheets.

27. A medium according to claim 26, wherein when data are input to data input positions of the plurality of types of worksheets, a data processing order is predetermined.

28. A medium according to claim 16, wherein a date of application is input to the rule setting data input position by use of a business logic term for setting business rule.

29. A medium according to claim 28, wherein the date of application includes a date of start of application and a date of end of application, and data input positions for the date of start of application and the date of end of application are present.

30. A medium according to claim 28, wherein a processing routine for requesting a password key input is concomitantly operated under an environment of the rule setting software in order to input the date of application.

31. An apparatus for applying and preparing software, comprising:

a worksheet file storing various kinds of business worksheets each using at least one business logic term representing a minimum unit in a business operation, said business worksheets including rule setting worksheets for inputting business rule setting data and application data inputting worksheets for inputting application data;

rule setting means for displaying a given one of the rule setting worksheets which corresponds to user selection information on a display, on which a rule setting data input position of the given rule setting worksheet is indicated by a corresponding business logic term in such a manner that a user can input the business rule setting data to said rule setting data input position and change the business rule setting data in said rule setting data input position, said display being located at a remote place and connected via a communication path;

a business data file for, when data is input to the rule setting data input position, storing the input data as business rule setting data together with the corresponding business logic term;

first using means for displaying a given one of the application data inputting worksheets which corresponds to user selection information on the display, on which an application data input position of the given application data inputting worksheet is indicated by a corresponding business logic term, said first using means being located at the remote place and connected via the communication path;

second using means for inputting application data corresponding to the business logic term stored in said business data file; and business logic applying means for, when the application data is input, determining software to be used in correspondence with the business logic term corresponding to the application data, performing arithmetic processing by the determined software using the application data and the business rule setting data corresponding to the application data, obtaining an arithmetic processing result, and thereby supporting a business work of the user.

* * * * *